United States Patent [19]
Webb et al.

[11] Patent Number: 6,052,146
[45] Date of Patent: Apr. 18, 2000

[54] ALIGNMENT OF A VIDEO MONITOR USING AN ON-SCREEN DISPLAY CHIP AND A GAIN MATRIX TABLE

[75] Inventors: James R. Webb, Boulder; Ron C. Simpson, Erie, both of Colo.

[73] Assignee: Display Laboratories, Inc., Boulder, Colo.

[21] Appl. No.: 08/611,098

[22] Filed: Mar. 5, 1996

Related U.S. Application Data

[63] Continuation-in-part of application No. 08/258,393, Jun. 13, 1994, Pat. No. 5,504,521, and application No. 08/585,926, Jan. 16, 1996.

[51] Int. Cl.⁷ .......................... H04N 17/00; H04N 17/04
[52] U.S. Cl. ........................................... 348/190; 348/180
[58] Field of Search .................................... 348/190, 189, 348/191, 180, 181, 182, 184, 185, 177, 178; 315/368.11, 368.12, 368.13; H04N 17/00, 17/04

[56] References Cited

U.S. PATENT DOCUMENTS

| | | |
|---|---|---|
| 4,058,826 | 11/1977 | Schneider . |
| 4,203,054 | 5/1980 | Sowter ............................. 315/368.13 |
| 4,654,706 | 3/1987 | Davidson ............................... 358/139 |
| 4,672,275 | 6/1987 | Ando ..................................... 315/368 |
| 4,673,847 | 6/1987 | Louie et al. ...................... 315/368.13 |
| 4,757,239 | 7/1988 | Starkey, IV ............................ 315/371 |
| 4,772,948 | 9/1988 | Irvin . |
| 4,816,908 | 3/1989 | Colineau et al. . |
| 4,897,721 | 1/1990 | Young et al. ........................... 348/190 |
| 4,952,851 | 8/1990 | Macaulay ............................... 315/398 |
| 5,020,116 | 5/1991 | McCauley . |
| 5,059,979 | 10/1991 | Micic et al. . |
| 5,081,523 | 1/1992 | Frazier . |
| 5,216,504 | 6/1993 | Webb ..................................... 358/139 |
| 5,276,632 | 1/1994 | Corwin et al. . |
| 5,325,196 | 6/1994 | Yoshimi et al. ....................... 348/190 |
| 5,426,519 | 6/1995 | Banton . |
| 5,432,548 | 7/1995 | Byen ..................................... 348/180 |
| 5,440,340 | 8/1995 | Tsurutani ............................... 348/190 |
| 5,504,521 | 4/1996 | Webb et al. ............................ 348/180 |
| 5,657,078 | 8/1997 | Saito et al. ............................. 348/180 |
| 5,677,732 | 10/1997 | Moon ..................................... 348/190 |

FOREIGN PATENT DOCUMENTS

| | | |
|---|---|---|
| 1-204594 | 8/1989 | Japan . |
| 1-204595 | 8/1989 | Japan . |
| 3-99376 | 4/1991 | Japan . |

OTHER PUBLICATIONS

Gregory A. Kern, CRT Display Inspection with a Solid State Camera—3D Modelling and Parallax Correction, Jun. 1994, 4 pages.

(List continued on next page.)

*Primary Examiner*—Michael H. Lee
*Attorney, Agent, or Firm*—Merchant & Gould; William W. Cochran

[57] ABSTRACT

A circuit within a video monitor for making corrections during horizontal scan includes a data storage device containing information relating to a selected display parameter, an integrator receptive of the stored information and adapted to produce an integrated signal therefrom, and an amplifier receptive of the integrated signal for supplying signals to the video monitor based on the integrated signal. The information supplied from the data storage device to the integrator is encoded in a pulse density modulated waveform via a tri-state gate and a one-shot timer. The information stored in the data storage device is stored in bytes, each byte containing a "sign bit" and a plurality of data bits. The present invention also discloses the use of an on-screen display chip that uses stored fonts to generate a pulse-density modulated signal. Gradients between rows of fonts can be generated using selected fonts from a font gradient table or can be produced using an up-down counter. Gain matrix tables are also disclosed that reside in the vision system to aid the vision system in predicting proper alignment of less intelligent monitors. Gain matrix table data can also be supplied to the monitor correction table so as to provide updated intelligence to the monitor.

9 Claims, 21 Drawing Sheets

OTHER PUBLICATIONS

Steven J. Lassman, Firmware for a Continuous Frequency CRT Monitor, Jun. 1994, 4 pages.

Society for Information Display, 1996 Display Manufacturing Technology Conference: Digest of Technical Papers, Feb. 6–8, 1996, 7 pages.

Suckle, Leonard I., "Automatic Alignment Techniques for Color TV Manufacturing," IEEE 1988 International Conference, Jun. 8–10, 1988, Rosemont, Illinois.

SGS–Thomson "STV9420/21 Mulitsync on Screen Display for Monitor" Oct. 1993, Carrollton, Texas.

*J.R. Webb. Micro–Chip Architecture for Full Digital Control of Geometry, Convergence and Colimetry in CRT Monitors, Jun. 14, 1996, Display Laboratories, Inc., Boulder, Colorado.

*S.J. Lassman, "Formware for A Continuous frequency CRT Monitor", Jun. 14, 1996, Display Laboratories, Inc., Boulder, Colorado.

*A. Ramamurty, et al., "Distortion Measurement and Simulataneous Adjustment of Multiple Interacting Controls on CRT Monitors", Photo Research Inc. Chatsworth, California, Feb. 6–8, 1996.

*Society for Information Display International Symposium Digest o fTechniqucal Paper, vol. XXV, May 1994.

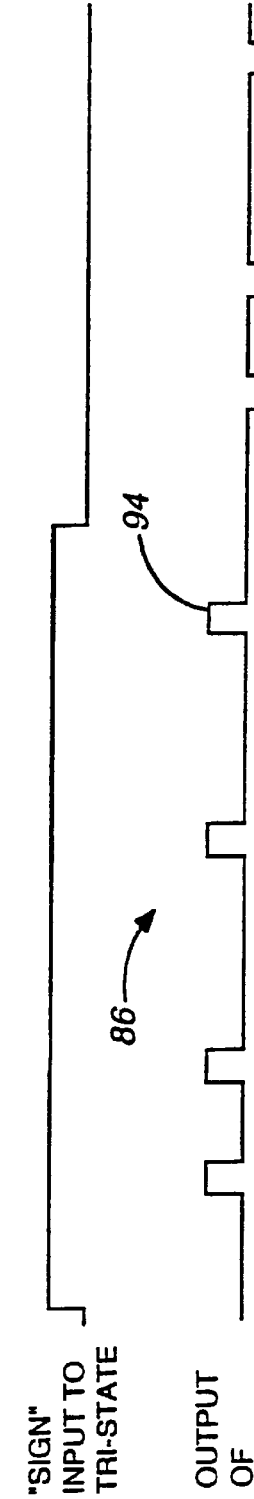
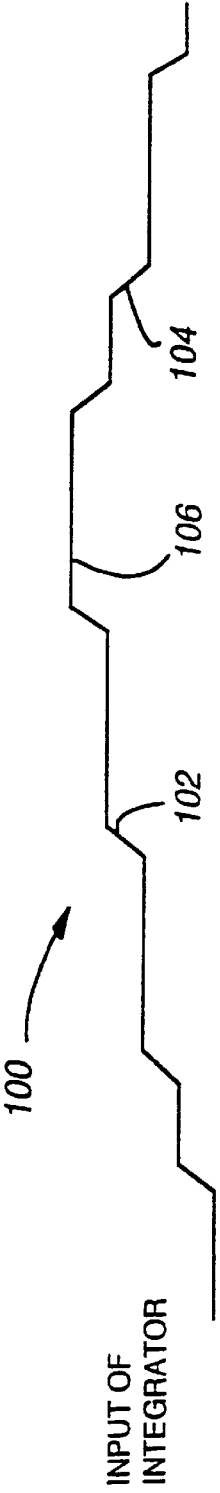
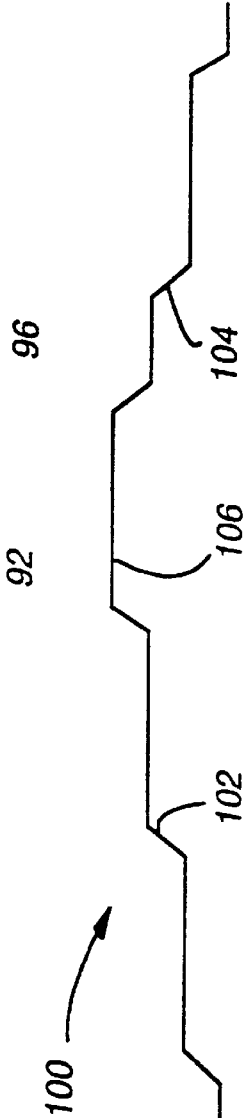
*Fig. 4A* OSC
*Fig. 4B* DATA
*Fig. 4C* OUTPOT OF ONE-SHOT
*Fig. 4D* "SIGN" INPUT TO TRI-STATE
*Fig. 4E* OUTPUT OF TRI-STATE
*Fig. 4F* INPUT OF INTEGRATOR

Fig. 5A  OSC
Fig. 5B  DATA
Fig. 5C  OUTPOT OF ONE-SHOT
Fig. 5D  "SIGN" INPUT TO TRI-STATE
Fig. 5E  OUTPUT OF TRI-STATE
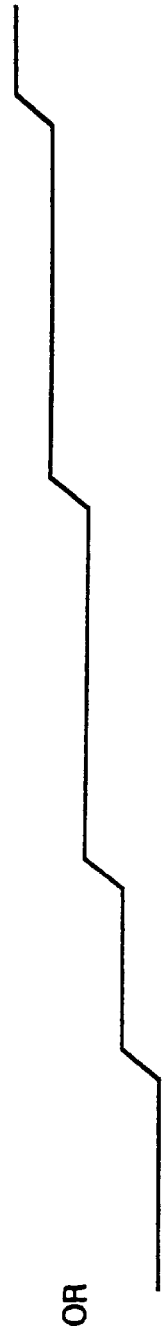
Fig. 5F  INPUT OF INTEGRATOR

GRADIENT FONT TABLE
237

| 0  | 1  | | 12 |
|----|----|--|----|
| 12 | 12 | | 12 |

| 0 | | 12 |
|---|--|----|
| 0 | | 0  |

Fig. 14

ALIGNMENT OF A VIDEO MONITOR USING AN ON-SCREEN DISPLAY CHIP AND A GAIN MATRIX TABLE

CROSS-REFERENCE TO RELATED APPLICATIONS

The present invention is a continuation-in-part of U.S. patent application Ser. No. 08/258,393 filed on Jun. 13, 1994 now U.S. Pat. No. 5,504,521, by James R. Webb and Ron C. Simpson entitled "Method and Apparatus for Making Corrections in a Video Monitor During Horizontal Scan" and U.S. patent application Ser. No. 08/585,926 filed Jan. 16, 1996 by James R. Webb and Ron C. Simpson entitled "Method and Apparatus for Making Corrections in a Video Monitor During Horizontal Scan" which is a continuation of the above-identified application.

BACKGROUND OF THE INVENTION

1. Field of Invention

This invention relates generally to video monitors and automatic alignment systems for video monitors, particularly automatic alignment systems including circuits for adjusting or correcting predetermined characteristics of the monitor's displayed image during the horizontal scan of the monitor.

2. Description of the Background

Video monitors, such as for use with digital computers, typically include a cathode ray tube (CRT) and driver circuitry including video, horizontal and vertical amplifiers. Early versions of video monitors included a variety of potentiometers which were adjusted at the factory to align and adjust the display presented on the CRT. Also, a few pots were accessible on the exterior of the monitor for adjustment by the user. The external pots commonly included controls for brightness, contrast and possibly horizontal and vertical size and center position.

More modern monitors often include a relatively larger number of adjustable parameters which can be used to provide a more precisely-aligned and color-balanced display. Some of the modern monitors include digital control circuits for storing values of these adjustable parameters and for controlling the driver circuitry of the monitor in accordance with the stored values.

U.S. Pat. No. 5,216,504 for "Automatic Precision Video Monitor Alignment System" is specifically incorporated herein by reference for all that it discloses. This patent discloses an alignment system including a pick-up camera located adjacent to the CRT of a monitor for capturing an image of the display and communicating the image to a computer. The computer communicates with a microprocessor and digital control circuit within the monitor which control the video driver circuit of the monitor. The system operates to automatically and optimally adjust the alignment and color balance of the display for the particular video signal which is applied to the monitor and for the particular settings of the external controls on the monitor.

In order to most accurately adjust the alignment and color balance of the display, it is desirable to make variable adjustments during the vertical and horizontal scan of the CRT by the driver circuitry. Variable adjustments during the vertical scan of the CRT by the driver circuitry accomplished by a voltage waveform generator which develops a pulse-width modulated (PWM) signal for each display parameter to be controlled. As disclosed in U.S. Pat. No. 5,216,504, the width of the PWM signal corresponds to the magnitude of the target value for the display parameter. The pulse-width can be varied during the vertical scan to give the desired target value. Rather than provide a separate PWM signal for each horizontal line in the vertical scan, the lines are grouped into a smaller number of segments. A separate PWM signal is provided for each segment, with each signal representing the rate of change of the display parameter during the given segment. This rate of change is integrated once to form a smooth correction.

Unfortunately, no such correction is available for variable adjustment during the horizontal scan of the CRT due to the much higher horizontal scan frequency versus the vertical scan frequency.

It is against the background, and the limitations and problems associated therewith, that the present invention has been developed.

SUMMARY OF THE INVENTION

The apparatus of the present invention for making corrections in a video monitor during horizontal scan includes a data storage device containing information relating to a target value for a selective parameter relating to one of a plurality of display characteristics of the video monitor. The circuit also includes an integrator receptive of the stored information and adapted for producing an integrated signal which is supplied to an amplifier which in turn supplies a signal based on the integrated signal to the monitor.

Another aspect of the apparatus of the present invention for making corrections in a video monitor during horizontal scan includes a CRT, an amplifier for generating signals for the CRT, and a data storage device containing information relating to a target value for a given parameter relating to a display characteristic of the monitor. An integrator receives the stored information and is adapted for producing an integrated signal therefrom and supplying same to a video amplifier which supplies a signal based thereon to the CRT.

A method for making corrections in a video monitor during horizontal scan includes storing information relating to a target value for a parameter relating to display characteristics of a video monitor. The stored information is integrated to create an integrated signal which is summed with other signals to create a corrected signal. The corrected signal is supplied to a driver amplifier of the video monitor and the CRT is driven in accordance therewith.

A still further apparatus for making corrections in a video monitor during horizontal scan includes a circuit with a data storage device containing information relating to a target value for a selected parameter relating to one of plurality of display characteristics of the video monitor. The stored information is used to create a horizontal rate waveform. The horizontal rate waveform is supplied to an integrator that controls the monitor in accordance therewith.

The present invention also includes a method of generating a gradient of pulse density modulation signals from an on-screen display device to correct a video monitor that includes the steps of retrieving a plurality of gradient tables from the on-screen display device in a predetermined order such that rows of pixels stored in the gradient tables form a predetermined pixel density gradient between the rows of pixels and the gradient tables, reading the rows of pixels in the plurality of gradient tables to produce a first data signal, reading a series of second data signals that are stored in association with the gradient tables, and logically combining the series of first and second data signals to produce the gradient of pulse density modulated signals.

The present invention also includes a method for generating a pulse density signal for correcting geometries in a video monitor that has a predetermined number of starting pulses and a predetermined rate of change that comprises the steps of loading a counter with the predetermined starting count number representative of the predetermined number of starting pulses of the pulse density signal, generating a rate control signal corresponding to the predetermined rate of change, and applying the rate control signal to the counter to produce the pulse density signal having the predetermined number of starting pulses and the predetermined rate of change.

The present invention also includes a method of using a vision system for aligning a less intelligent monitor using a gain matrix table that includes correction data for correcting monitor geometries that is not included in monitor correction table data stored in the less intelligent monitors comprising the steps of generating the gain matrix table that includes the correction data that is not included in the monitor correction table data stored in the less intelligent monitor, and using the correction data of the gain matrix table to align the less intelligent monitor so that alignment can be achieved by predicting proper alignment geometries through the use of the correction data that is not included in the monitor correction table data.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

FIGS. 4A, 4B, 4C, 4D, 4E and 4F are voltage waveforms of signals in the circuit shown schematically in FIGS. 2 and 3.

FIGS. 5A, 5B, 5C, 5D, 5E and 5F are voltage waveforms of signals in the circuit shown schematically in FIGS. 2 and 3, shown with a different oscillator frequency than in FIGS. 4A–4F.

FIG. 14 schematically illustrates a manner in which a gradient font table can be generated.

Figure 15:
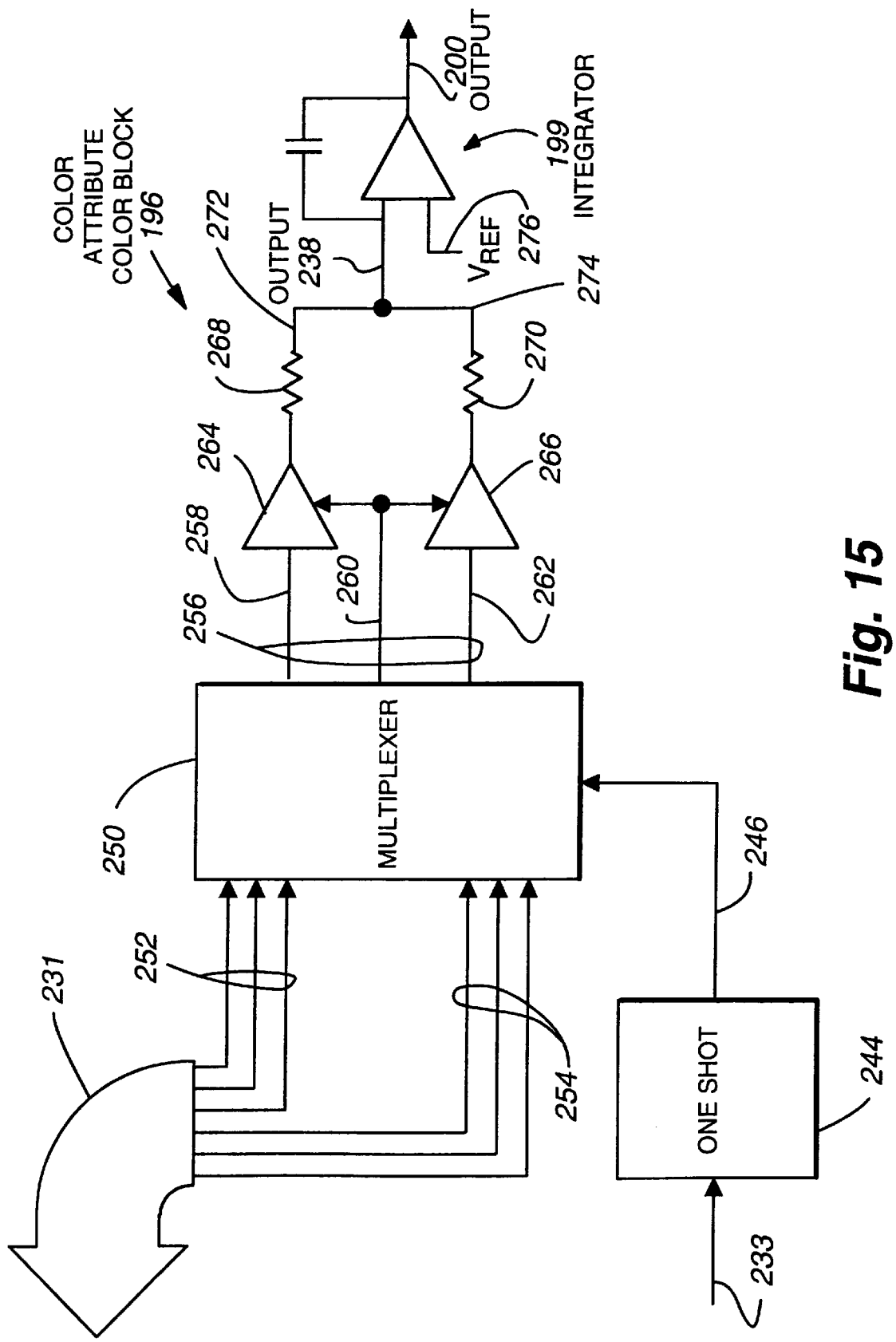

FIG. 15 is a schematic diagram of the color attribute logic block.

Figure 16:
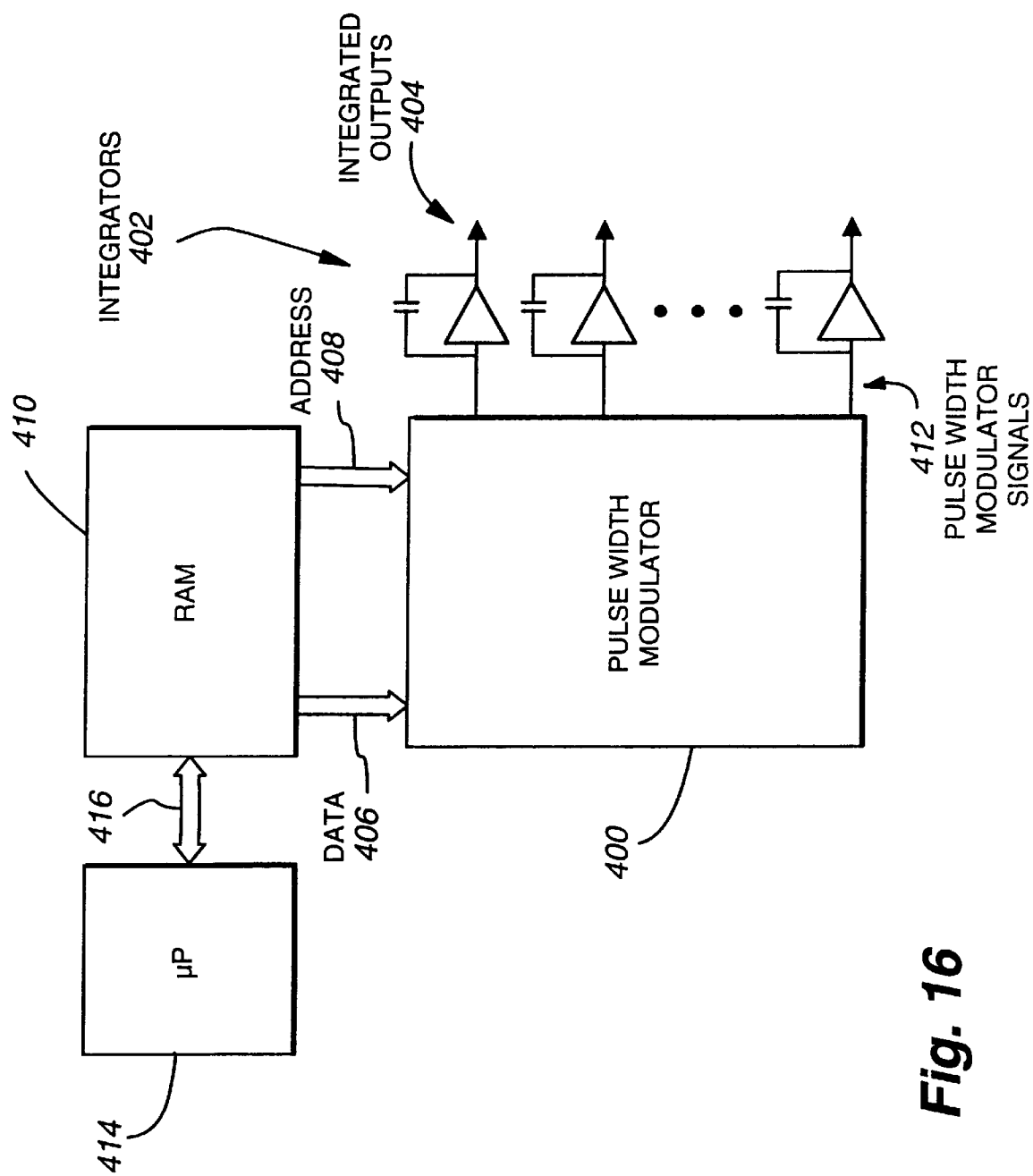

FIG. 16 is a schematic block diagram of the implementation of the present invention with a pulse-width modulator coupled to integrators.

Figure 17:
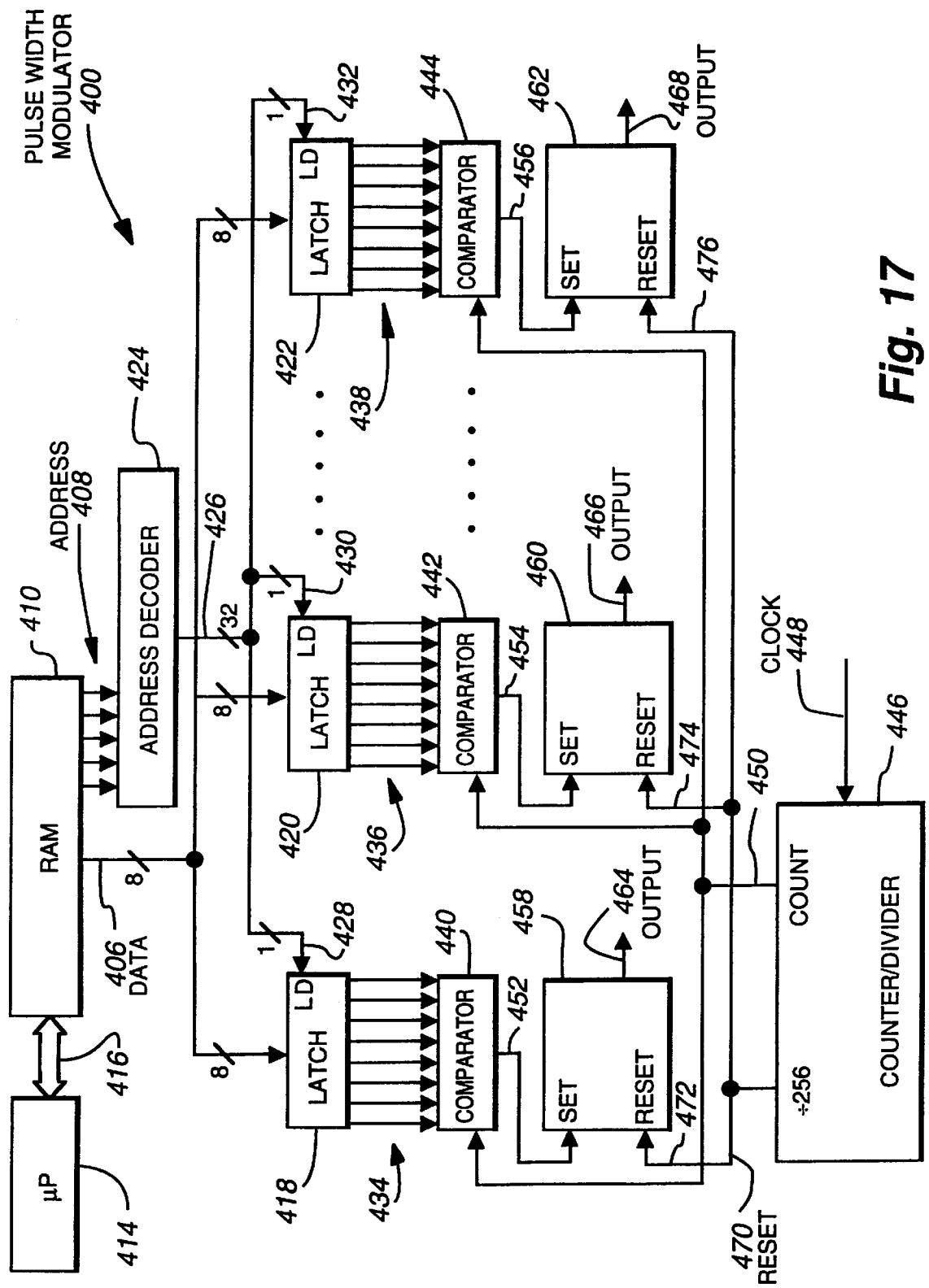

FIG. 17 is a detailed schematic block diagram of the pulse-width modulator of FIG. 16.

Figure 18:
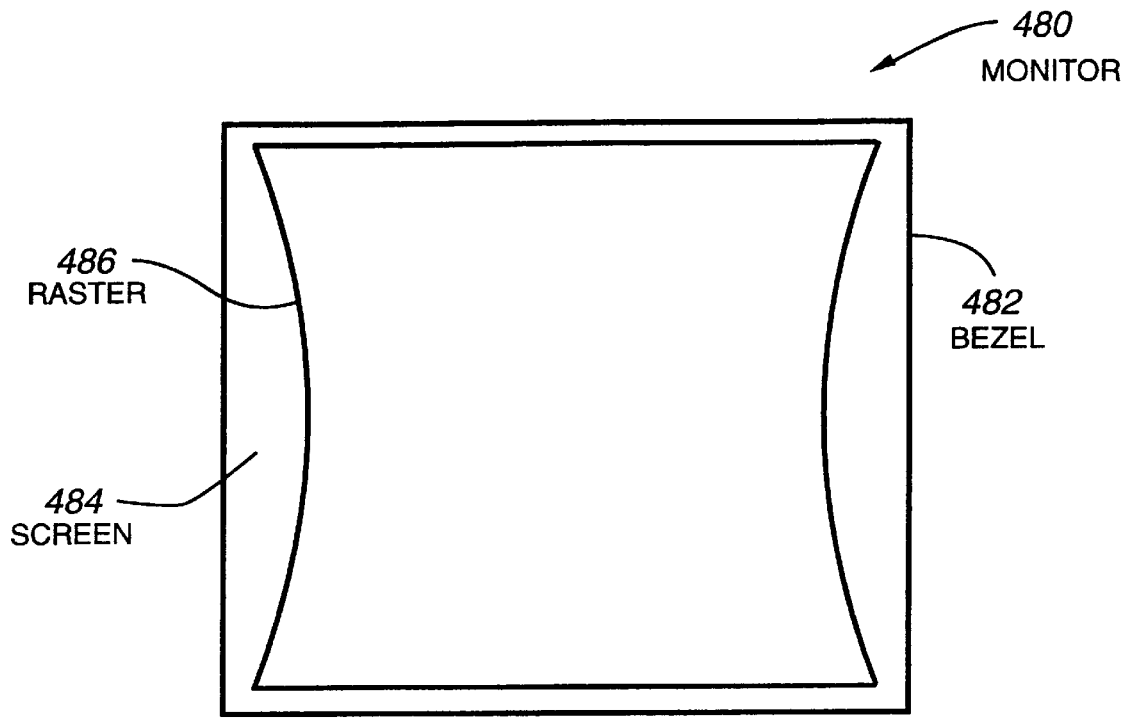

FIG. 18 schematically illustrates the effect of pin-cushioning on a monitor screen.

Figure 19:
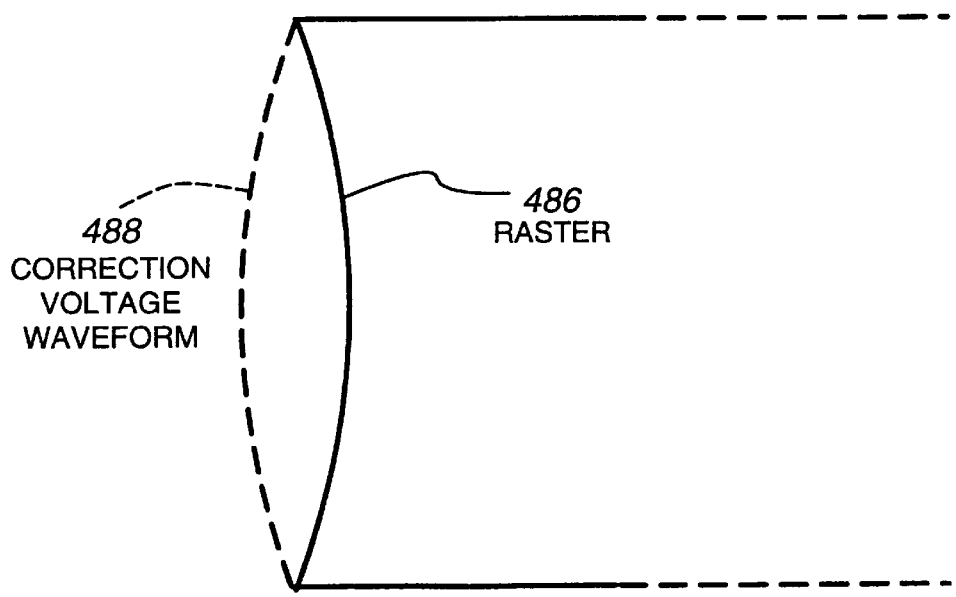

FIG. 19 schematically illustrates a correction voltage waveform to correct pin-cushioning.

Figure 20:
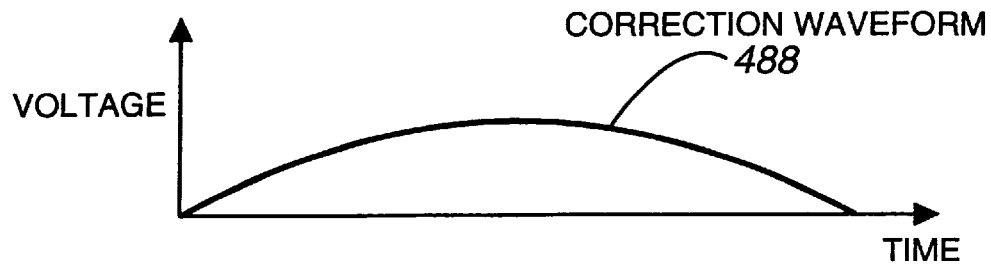

FIG. 20 illustrates the correction waveform in a voltage versus time graph.

Figure 21:
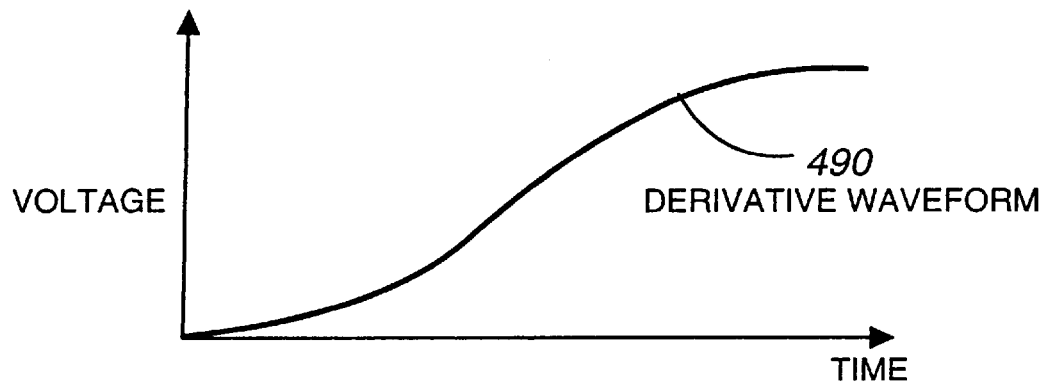

FIG. 21 illustrates a derivative waveform of the correction waveform of FIG. 20.

Figure 22:
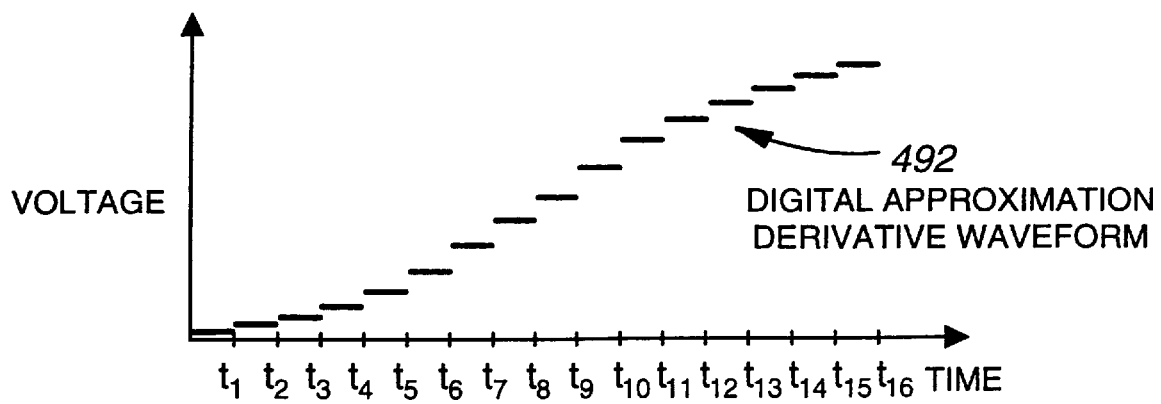

FIG. 22 illustrates a digital approximation of the derivative waveform of FIG. 21.

Figure 23:
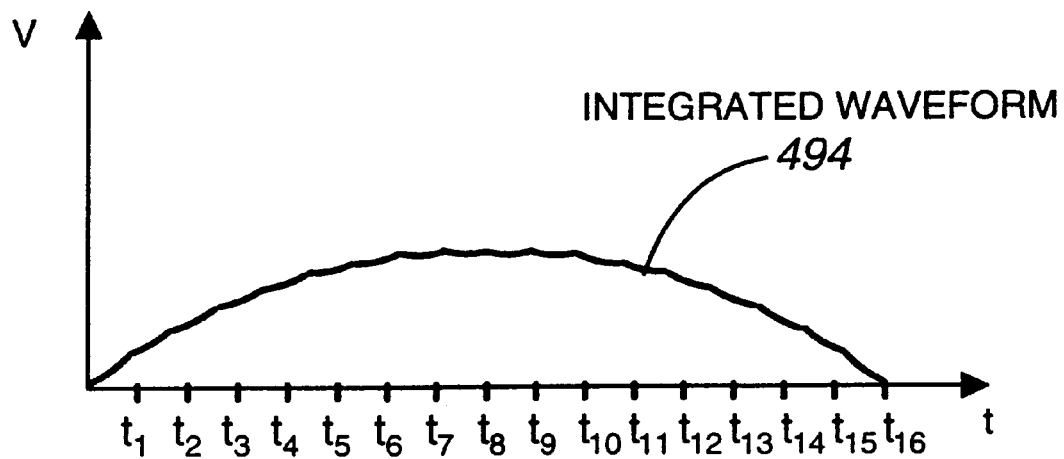

FIG. 23 illustrates an integrated version of the digital approximation derivative waveform of FIG. 22.

Figure 24:
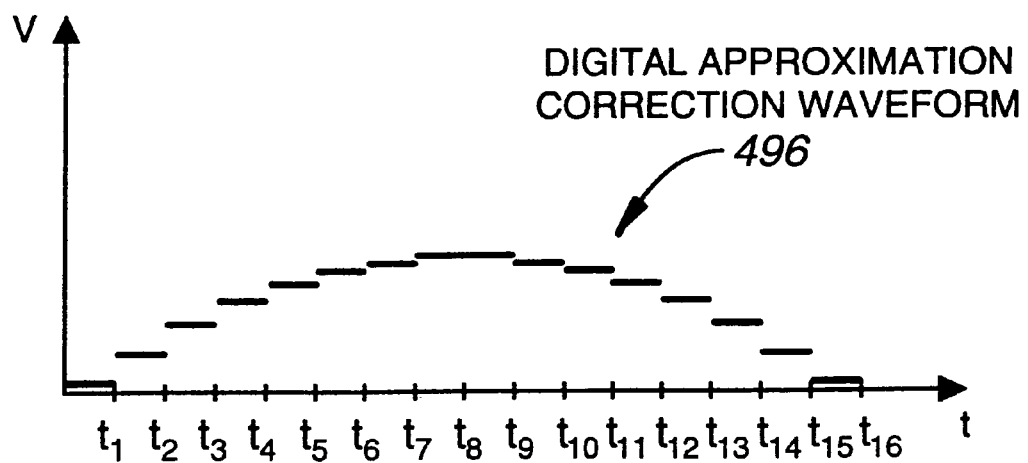

FIG. 24 illustrates a digital approximation correction waveform.

Figure 25:
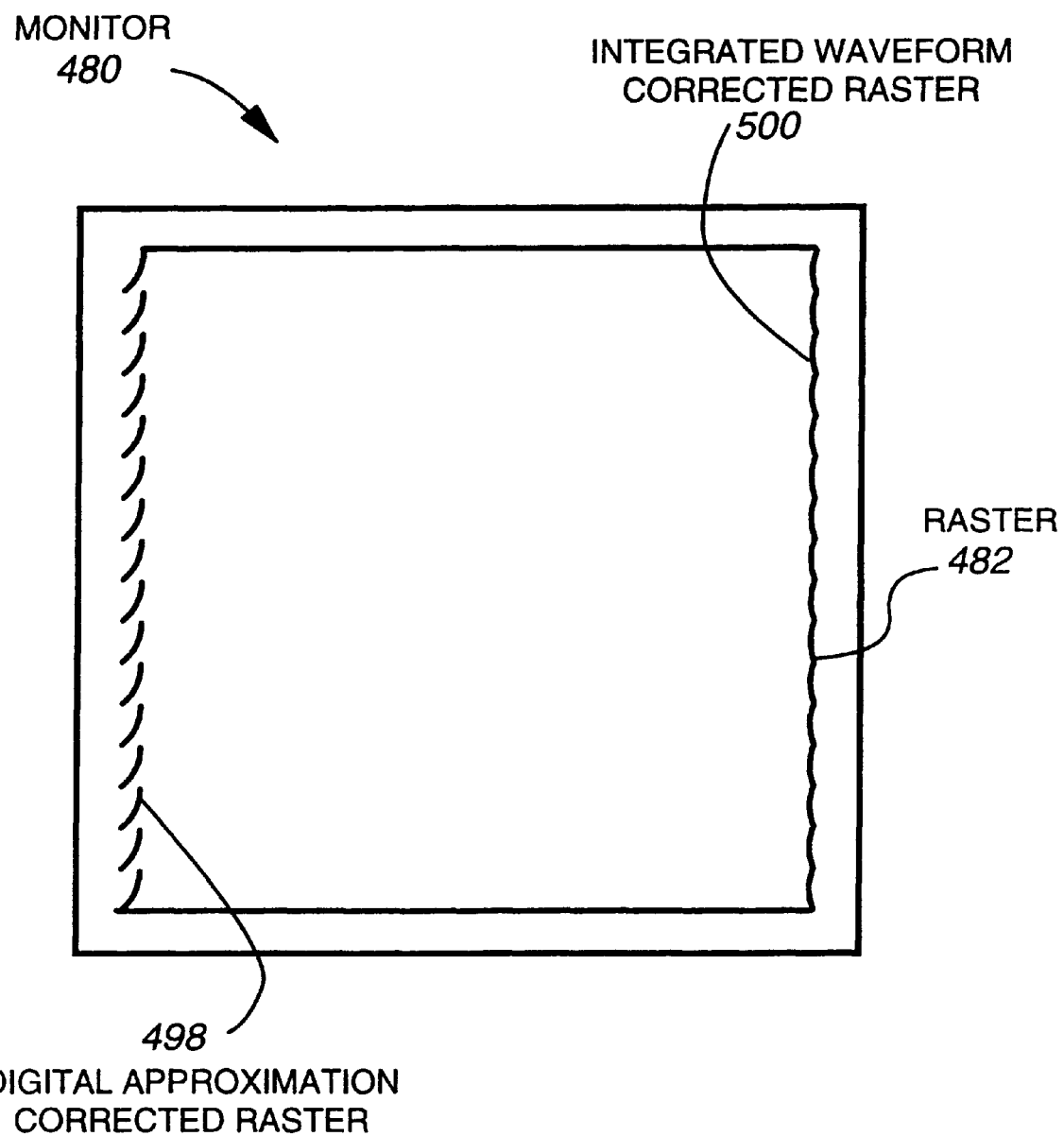

FIG. 25 schematically illustrates the result of application of an integrated waveform and a digital approximation correction waveform to a monitor to correct pin-cushioning.

Figure 26:
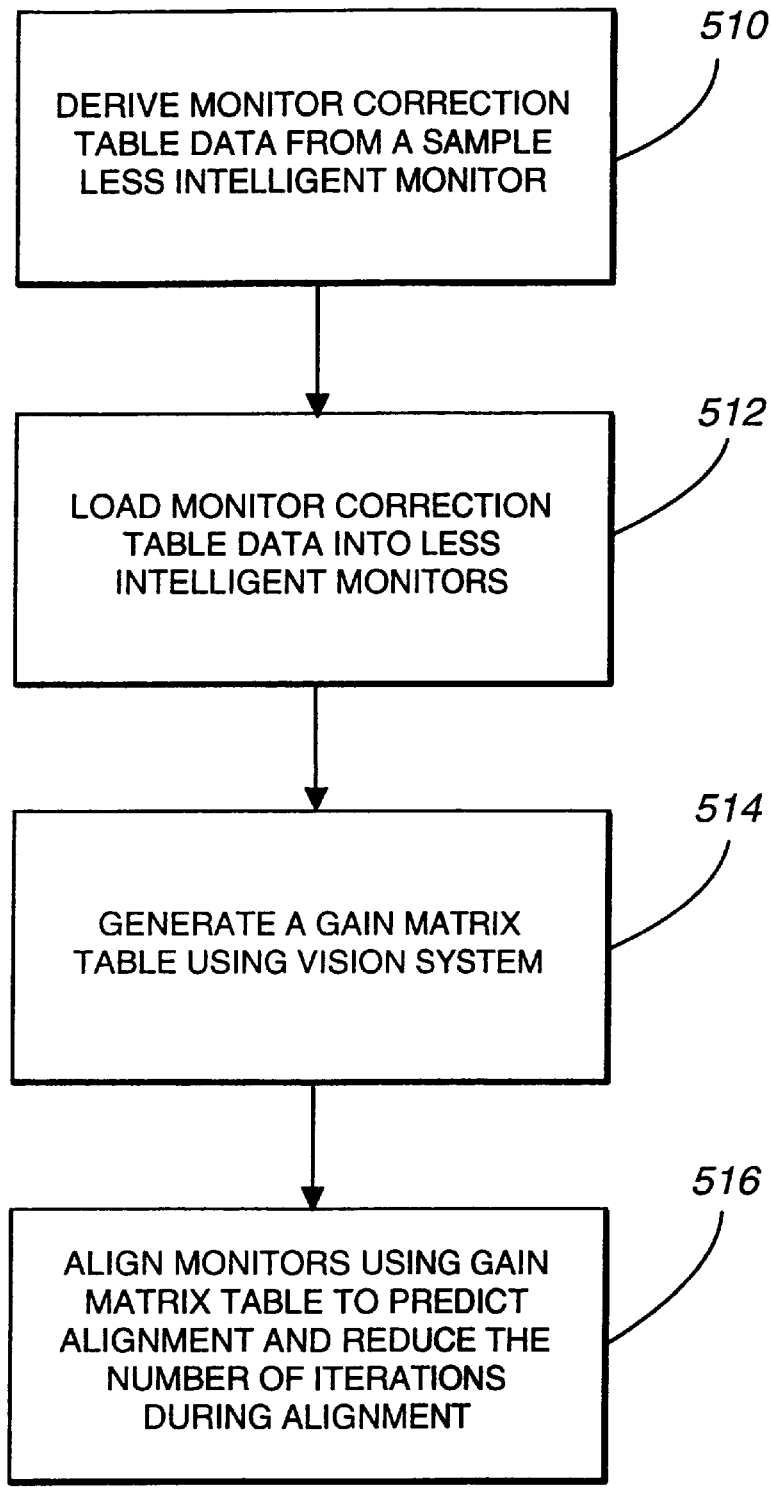

FIG. 26 is a schematic flow diagram of the manner in which a gain matrix table can be utilized to reduce the number of iterations in an alignment process.

Figure 27:
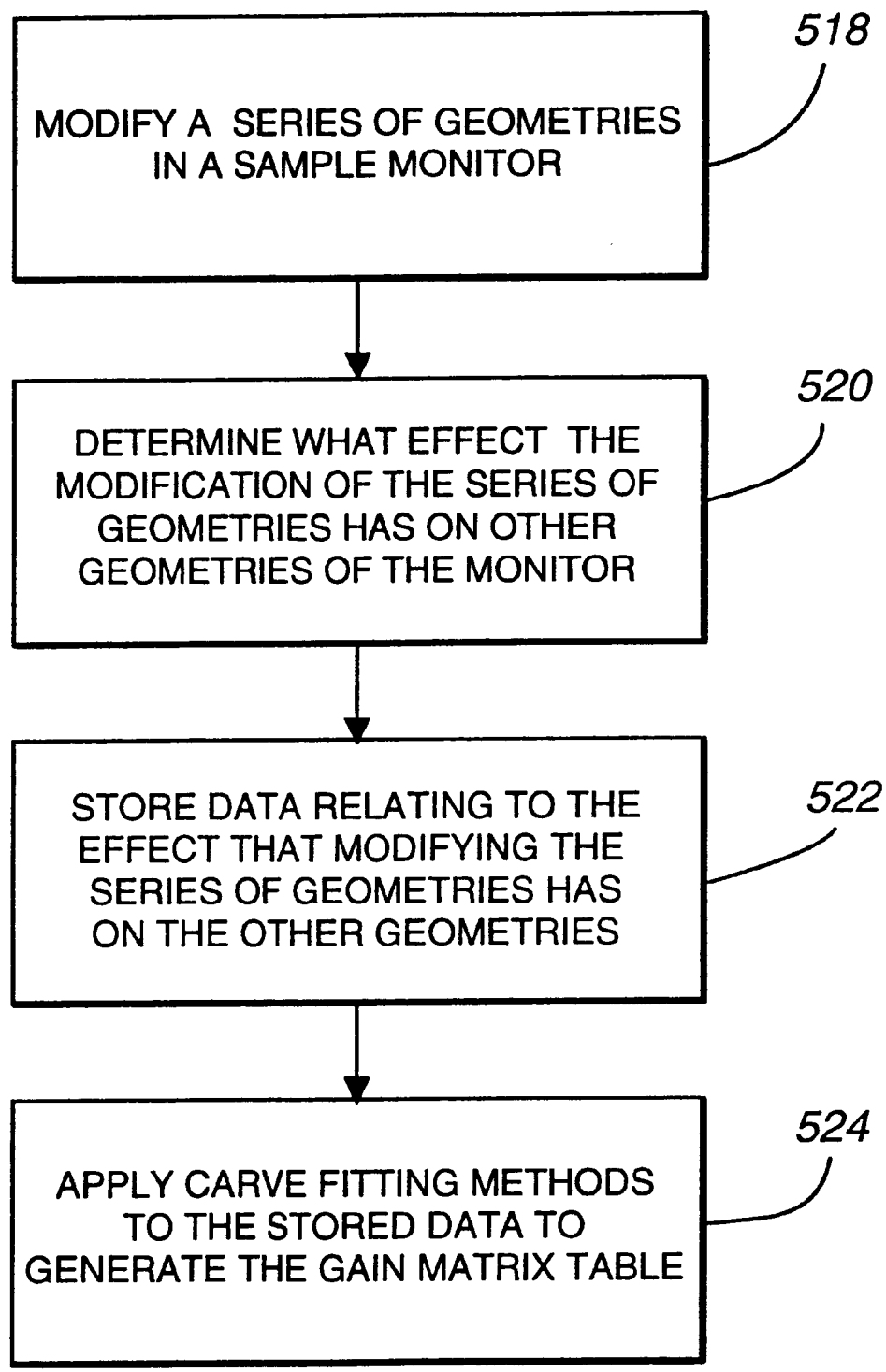

FIG. 27 is a schematic flow diagram illustrating the manner in which a gain matrix table is generated.

Figure 28:
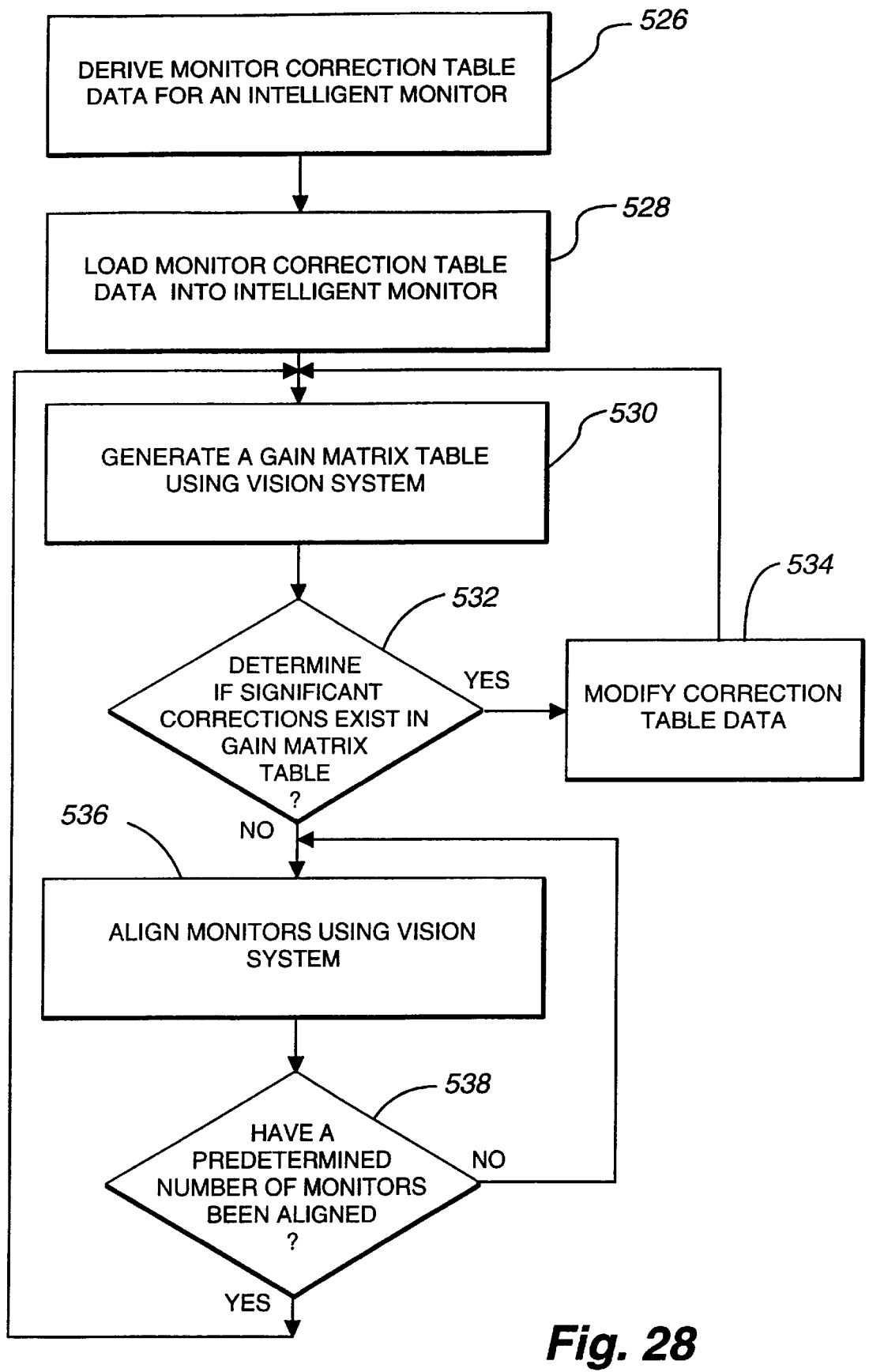

FIG. 28 is a schematic flow diagram illustrating the manner in which monitor correction tables may be updated with gain matrix table data.

DESCRIPTION OF THE PREFERRED EMBODIMENT

Figure 1:
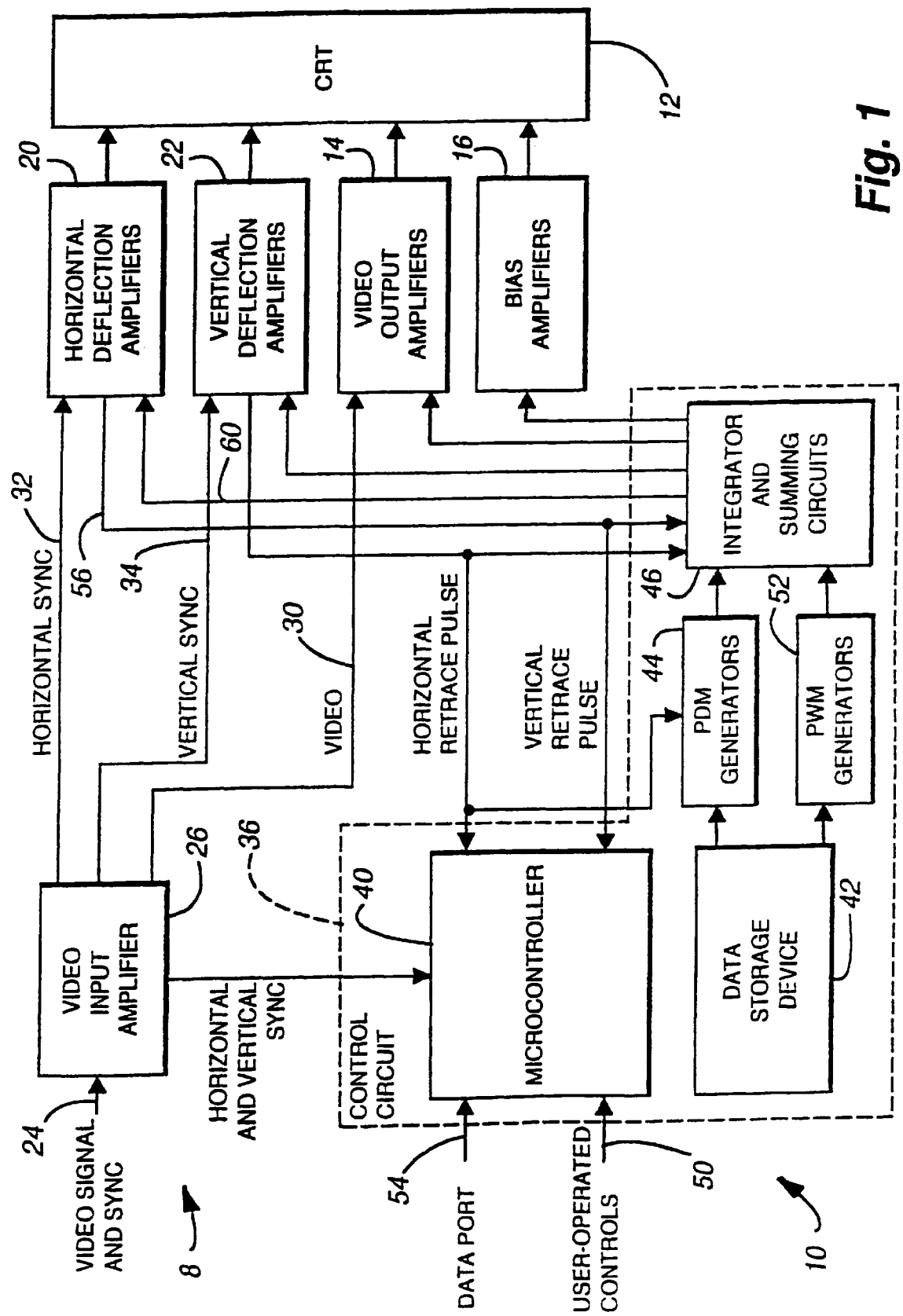
FIG. 1 is a block diagram of the system of the present invention for making corrections in a video monitor during horizontal scan of the CRT.

A technique for implementing adjustments to selected display parameters during horizontal scan of a video monitor 8 is implemented in a system 10 for controlling amplifiers for a CRT 12 of the monitor, as shown in FIG. 1. The amplifiers include video output amplifiers 14, bias amplifiers 16, horizontal deflection amplifiers 20 and vertical deflection amplifiers 22. A video signal 24 and associated sync signal are received by a video input amplifier 26 and divided into video 30, horizontal sync 32 and vertical sync 34 signals for the amplifiers. A control circuit 36 also supplies inputs to the amplifiers. The control circuit 36 includes a microcontroller 40 for receiving data and storing selected portions of the data in a data storage device 42. The data may be accessed from the device 42 by a pulse density modulation (PDM) generator 44 for generating a series of pulses which are received by an integrator and summing circuit 46 in order to modify one of the inputs into the video, bias, vertical or horizontal amplifiers. This modification is made during the horizontal scan of the CRT. The integrator and summing circuit receives "static" signals 50 from user-operated controls such as brightness, contrast, etc. and also receives signals relating to adjustments or modifications to be made during the vertical scan via the microcontroller 40, the data storage device 42, and a pulse-width modulation (PWM) generator 52.

The microcontroller 40, for example, a Motorola 68HC11, handles communications between the control circuit 36 and devices external to the monitor 8. These communications are provided through a data port 54 of the microcontroller 40 using standard RS-232 protocol. All adjustments to the control circuit 36 in the monitor 8, as well as queries about current monitor states are made over this port 54. In addition, the microcontroller 40 receives the signals 50 from user-operated controls such as brightness, contrast, etc. The microcontroller also receives the horizontal and vertical sync signals 32 and 34 from the video input amplifier 26 and horizontal and vertical retrace pulses 56 and 60 from the horizontal and vertical deflection amplifiers 20 and 22, respectively.

Figure 2:
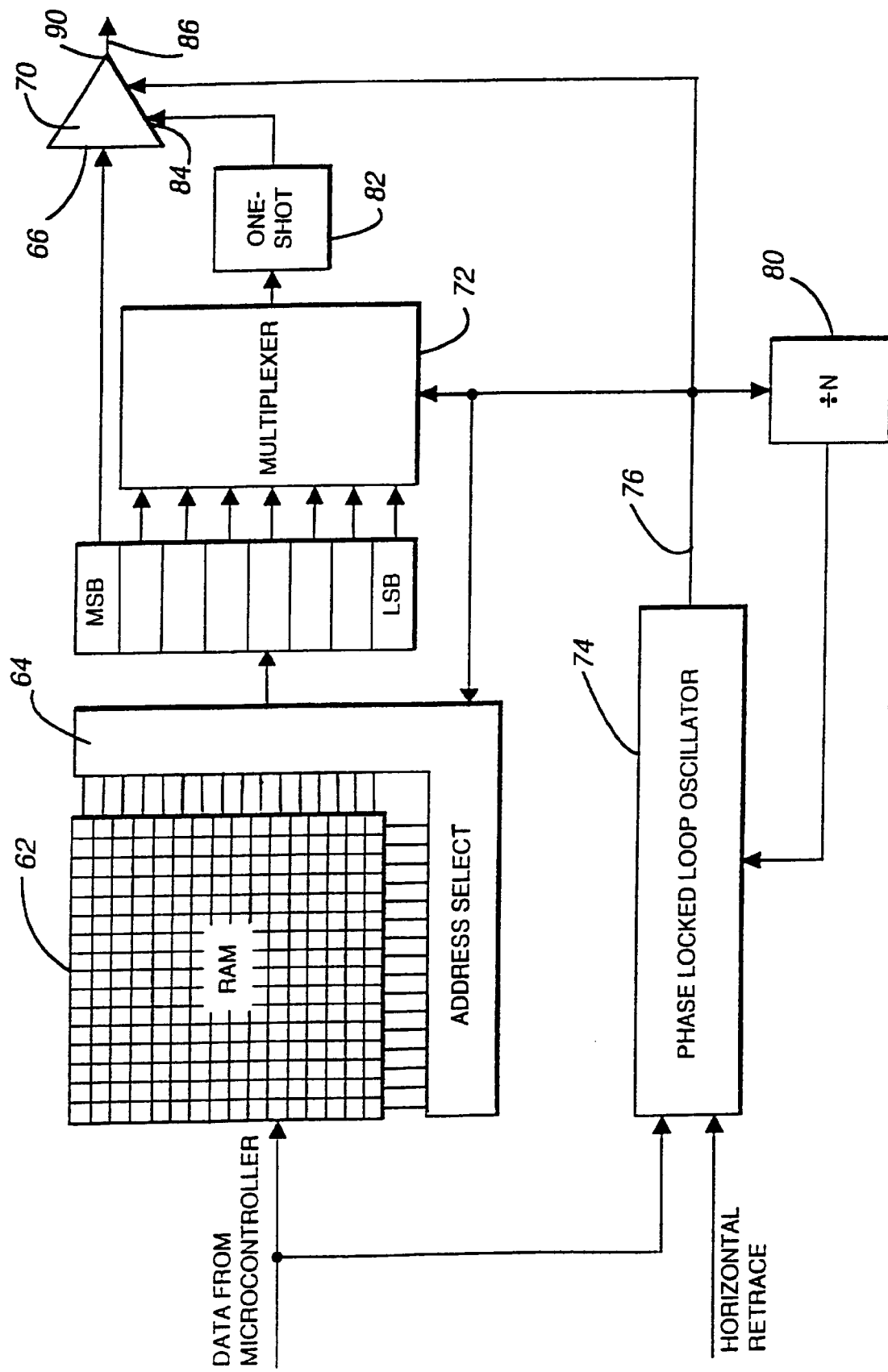
FIG. 2 is a schematic of the pulse density modulation generator and data storage device shown in FIG. 1.

The data storage device 42 may be any of several types of data storage devices, for example random access memory (RAM), as shown in FIG. 2. The RAM is arranged in an array having one or more dimensions. Described below is a two-dimensional array 62 which corresponds to a two-dimensional view of the image displayed by the monitor 8. Thus, RAM locations along the top row of the array contain information relating to the image displayed along the top edge of the monitor. Similarly, RAM locations along the vertical, left-hand column of the array contain information relating to the image displayed along the left-hand edge of the monitor. The array 62 of RAM preferably has sixteen columns and between sixteen and thirty-two rows. Each of the rows correspond to a group of raster scan lines in the image. Thus, with a 256-line image and sixteen rows, each row corresponds to a group of sixteen lines.

The RAM location in the first row, first column of the array contains one 8-bit byte of information as do each of the other RAM locations. Each byte of information contains data relating to a segment of pixels along the horizontal lines. The most significant bit (MSB) of the byte is analogous to a direction or "sign" bit or flag denoting a positive or negative slope to be encoded. The remaining seven bits of the byte are called data bits and are analogous to seven sequential pieces of "amplitude" information.

An address select circuit 64 associated with the RAM 62 is controlled to automatically sequence through each column of a particular row during the horizontal scan of the monitor 8 for the scan lines corresponding to the first group. As each byte is selected, the MSB is provided to an input terminal 66 of a tri-state gate 70, for example a Motorola MC74-125 or 126. The seven data bits are supplied to a multiplexer 72. The multiplexer 72 is clocked by a phase-locked loop oscillator 74 operating at an oscillation frequency equal to the horizontal rate multiplied by the number of columns or bytes multiplied by seven data bits in each byte. This frequency may preferably be in the range of twenty to thirty megahertz or greater.

An output signal 76 (FIG. 4A) from the oscillator 74 is also used to clock the address select circuit 64 and to trigger the tri-state gate 70. The oscillator receives commands from the microcontroller 40 as well as the horizontal retrace pulse 56 from the horizontal deflection amplifiers 20. The horizontal retrace pulse 56 is used as a reference for the oscillator 74. A divide-by-N counter 80 receives the output signal 76 from the oscillator 74 and provides the feedback signal to the oscillator for comparison to the reference.

As the multiplexer 72 is clocked, the least significant bit followed by the second least significant bit followed by the third least significant bit, and so forth, are supplied at the output of the multiplexer, ending with the second most significant bit (FIG. 4B). The output of the multiplexer is provided to a one-shot timer 82 whose output is provided to an enable terminal 84 of the tri-state gate. The one-shot timer 82, for example a Motorola SN74-221, provides a pulse of fixed time (FIG. 4C) duration to the tri-state gate 70. The one-shot timer 82 serves to maintain a given pulse-width out of the pulse density modulation (PDM) generator 44 despite variations or changes in the horizontal scan rate. Thus, even if the horizontal rate of a given video signal varies from the horizontal rate of another video signal, the width of the pulse supplied to the enable terminal 84 of the tri-state gate 70 will not vary (FIGS. 4 and 5). This is illustrated in FIG. 5 where the clock frequency is one-half the clock frequency in FIG. 4, yet the width of the one-shot pulse is the same.

As can be seen in FIG. 4E, a pulse density modulated (PDM) signal 86 at an output terminal 90 of the tri-state gate 70 will be at one of three levels. The data bit (FIG. 4B) determines whether the corresponding PDM signal 86 will be at an intermediate 92 or a non-intermediate level. If the PDM signal 86 is to be at a non-intermediate level, the most significant ("sign") bit of each byte (FIG. 4D) determines whether the signal will be at a high 94 or low 96 level.

The PDM signal 86 (FIG. 4E) is integrated by the integrator and summing circuit 46 to provide a horizontal waveform 100 (FIG. 4F) corresponding to the information stored in RAM 42. An example of this waveform 100 may be seen in FIG. 4F corresponding to the PDM signal 86 shown at FIG. 4E. It can be seen that the integrated waveform 100 has three slopes, a positive slope 102, a negative slope 104, and a zero slope 106. However, since the seven data bits in each byte are constrained to be of the same sign or direction, a change of direction (or a transition from positive to negative slope or vice versa) can only occur between each of the bytes. With sixteen bytes there will thus be fifteen inflection points in the integrated waveform 100.

Figure 3:
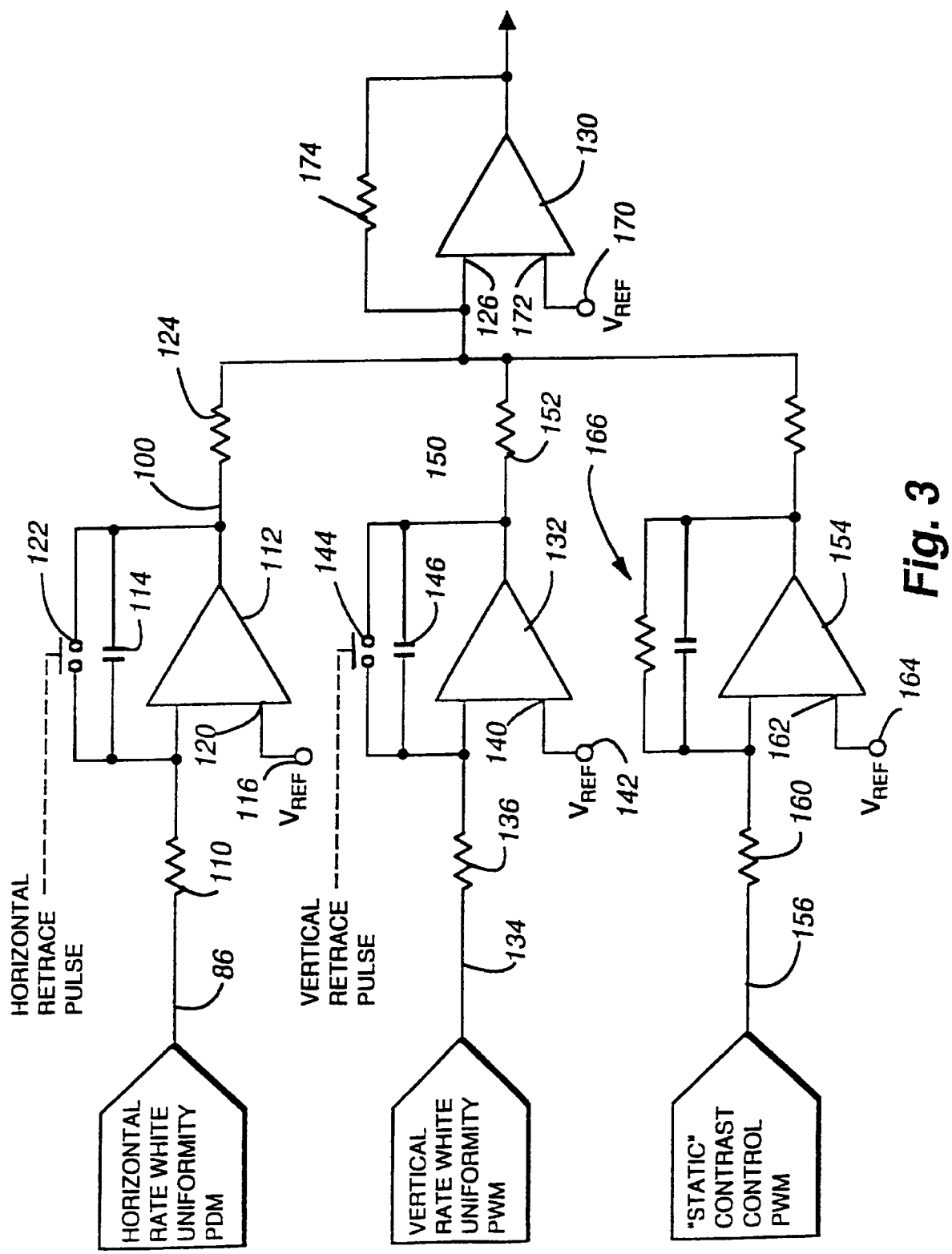
FIG. 3 is a schematic diagram of the integrator and summing circuit of the present invention shown in FIG. 1.

The relationship of the PDM signal 86 and integrated waveform 100 to the control of a particular display parameter can be seen in FIGS. 3 and 4. In this case, the display parameter shown is white uniformity and its effect on the display characteristic of contrast. However, similar examples could be given for horizontal convergence, vertical convergence and horizontal focus.

The horizontal-rate white uniformity (PDM) signal 86 from the tri-state gate 70 is supplied through a resistor 110 (FIG. 3) to a first integrating amplifier 112 having a capacitor 114 in its feedback path. The amplifier 112 has a voltage reference 116 supplied to a second input terminal 120. The amplifier 112 has a discharge switch 122 in parallel with the capacitor 114 to reset the value of the capacitor during each horizontal retrace pulse. Thus, the integration is only performed by this amplifier 112 during each horizontal scan line and then integration begins over again after each horizontal retrace pulse. The output of the first or horizontal integrating amplifier, the integrated waveform 100 discussed above, is supplied through a resistor 124 to a summing input terminal 126 of a summing amplifier 130.

A second integrating amplifier 132 receives a vertical-rate white uniformity pulse-width modulated (PWM) signal 134 of the type described in more detail in U.S. Pat. No. 5,216,504, incorporated herein by reference. The vertical-rate white uniformity (PWM) signal 134 is supplied through a resistor 136 to the second integrating amplifier 132. A second input terminal 140 of the second amplifier 132 is connected to a voltage reference 142. A discharge switch 144 is connected in parallel with a capacitor 146 in the feedback path of the second integrating amplifier 132. The discharge switch is controlled by the vertical retrace pulse so that integration by the second integrating amplifier only occurs during each vertical scan of the monitor and begins over again with the next vertical scan, after the vertical retrace pulse. The output of the second integrating amplifier, an integrated vertical waveform 150, is supplied through a resistor 152 to the summing input terminal 126 of the summing amplifier 130.

A third integrating amplifier 154 receives a signal 156 from the microcontroller 40 reflecting one of the "static" signals 50 from a static contrast control (not shown) operated by the user. The signal 156 from the contrast control is provided through a resistor 160 to the third integrating amplifier. A second input terminal 162 of the third amplifier is connected to a voltage reference 164. An R-C feedback path 166 is provided for this third amplifier. The output of the third integrating amplifier is provided to the summing terminal 126 of the summing amplifier 130.

The summing amplifier 130 has a voltage reference 170 applied to a second input terminal 172. A resistor 174 in the feedback path of the summing amplifier determines the gain of the summing amplifier. The output of the summing amplifier is supplied to the video amplifiers 14 in the case of this contrast/white uniformity signal. Each of the integrating and summing amplifiers 112, 132, 154 and 130 may be an MC34082.

Similar, parallel circuitry exists for adjustment of the horizontal convergence, vertical convergence and focus. Specifically, the RAM 42, multiplexer 72, one-shot timer 82 and tri-state gate 70 exist for each of the other three signals as well. Further, the integrating and summing circuit 46 described above is duplicated for each of these three signals. However, the vertical-rate and static signals are different and correspond to the appropriate horizontal-rate signal. For example, the horizontal-rate horizontal convergence signal is summed with the vertical-rate horizontal convergence signal and with static horizontal convergence. Similarly, the horizontal-rate vertical convergence signal is summed with the vertical-rate vertical convergence signal and with the static vertical convergence signal. Similarly, the horizontal-rate focus signal is summed with the vertical-rate focus signal and summed with the static focus DC level signal. These summed signals are then supplied to the appropriate amplifiers.

It is understood, of course, that the integrator and summing circuit 46 contains similar circuitry without the horizontal (first) integrating amplifier 112 for the case of the numerous signals where only vertical rate correction is made.

When video and sync signals 24 (FIG. 1) are supplied to the monitor 8, the horizontal and vertical deflection amplifiers 20 and 22 receive the sync signals 32 and 34 from the video input amplifier 26 and generate horizontal and vertical retrace pulses 56 and 60 which are also supplied to the microcontroller 40 and the integrator and summing circuit 46. The microcontroller 40 also receives the sync signals from the video input amplifier 26 and can compare the sync and retrace signals to test the accuracy and operation of the deflection amplifiers. In the absence of a video signal, the microcontroller still supplies a raster to the CRT 12 by commanding the deflection amplifiers to operate at predetermined horizontal and vertical frequencies. The microcontroller supplies these commands to the deflection amplifiers in the same manner as the other signals via the data storage device 42, the PWM generator 52 and the integrator and summing circuit 46. Further, the microcontroller can perform diagnostic tests on the control circuit 36 and deflection amplifiers in this manner as well as adjust the frequencies.

It has been discovered that some of the display parameters have an interdependence between them. For example, if the horizontal or vertical size is changed the horizontal and vertical convergence will need a certain correction to keep the convergence properly adjusted. The required horizontal rate correction is a function of horizontal position on the tube surface, vertical position on the tube surface, horizontal frequency, and vertical frequency. The horizontal and vertical positions are more dominant than the frequencies.

The required correction is not symmetrical with respect to the tube surface so there is no simple equation. The monitor may be adjusted to a standard size and center and then aligned at M-by-N grid positions relative to the tube surface. This may be repeated at several frequencies. Then, multi-dimensional interpolation may be used to generate the waveform for the given conditions of size, center and frequency. Since the groups are relative to the raster, as the user changes raster size or center, the groups move relative to the tube surface. Therefore, the correction for each group must be recomputed as a function of size and center. In this way, the system compensates as the user changes size and center. The interpolation is then a function of horizontal size adjustment, vertical size adjustment, horizontal center adjustment, vertical center adjustment, horizontal frequency, and vertical frequency.

Figure 6:
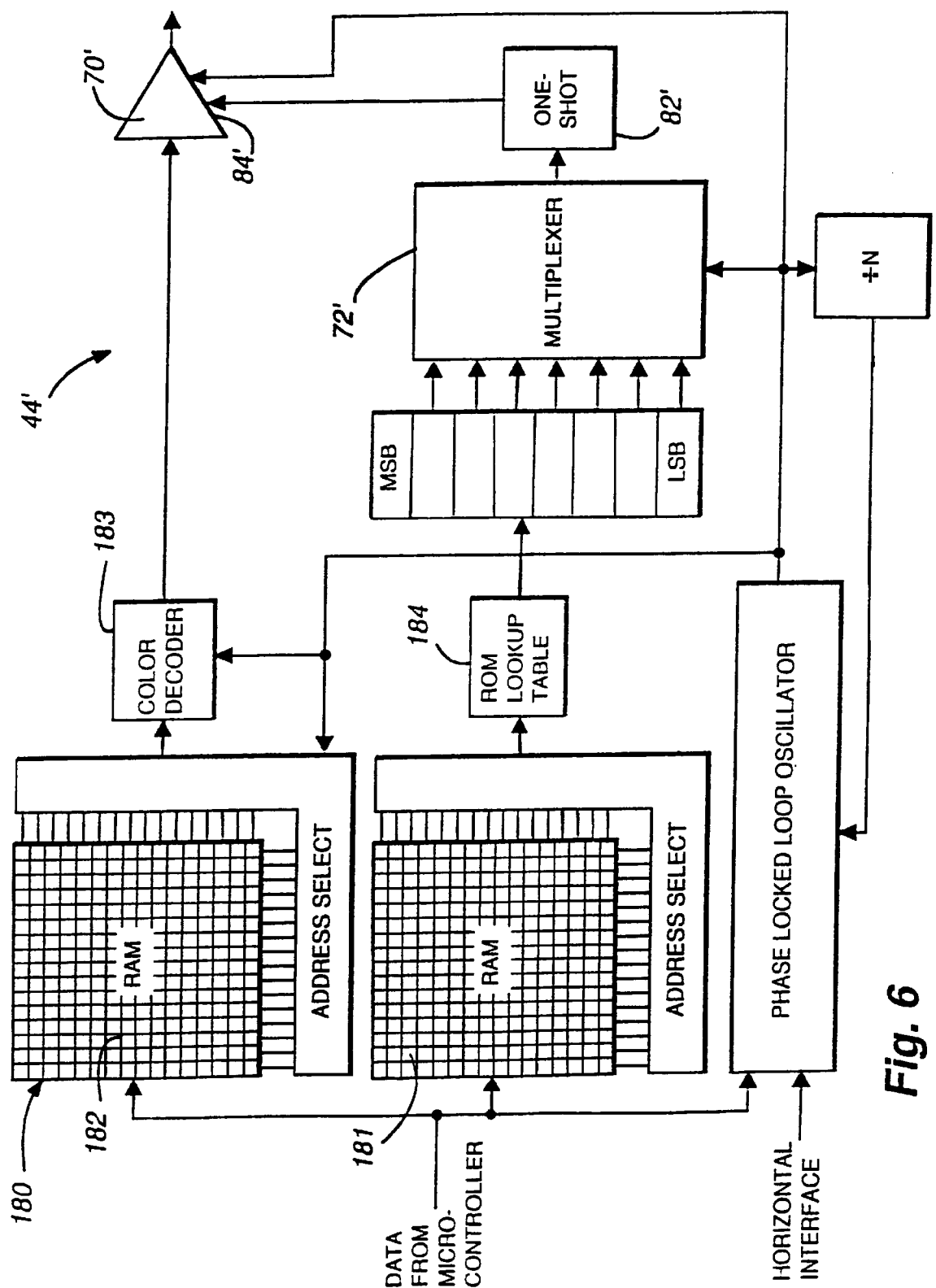
FIG. 6 is a second embodiment of the pulse density modulation generator and data storage device shown in FIG. 1.

The PDM generator 44' may alternatively be implemented in an SGS-Thompson XTV9421-1C, as seen in FIG. 6 (a prime designation is used). The SGS chip provides circuitry with some similarities to that shown in FIG. 2 with some significant differences. A three-dimensional RAM array 180 is provided, with a two-dimensional plane 181 of the array being dedicated to the data bits described previously. A second plane 182 relates to the "sign bits" corresponding to each byte in the first plane. This plane was originally used by SGS-Thompson to encode the colors corresponding to the information stored in the first plane. The present invention utilizes this "color" plane as follows. One "color" is encoded so as to always allow the data bits to be passed through the multiplexer 72' to the one-shot timer 82'. A second "color" is encoded with the "sign bits" for supplying same to the tri-state gate 70'. A third "color" is not used. A color decoder 183 is provided to decode the information relating to the three colors.

As before, the bytes in the first (data) plane contain eight bits. These bits are not the actual data, however. Instead each byte contains a seven-bit address to a ROM look-up-table 184 where each byte in the look-up table contains twelve bits of data. These twelve bits of data are supplied to the multiplexer 72' in a similar fashion as described above, with each of the twelve data bits being clocked through the one-shot timer 82' to the enable terminal 84' of the tri-state gate 70'.

Alternatively, the PDM signal 86 could be generated by a shift register (not shown) with an up or down pulse for each pixel in the display. Of course, such an approach would be either computationally intensive or require an inordinate amount of data storage.

Figure 7:
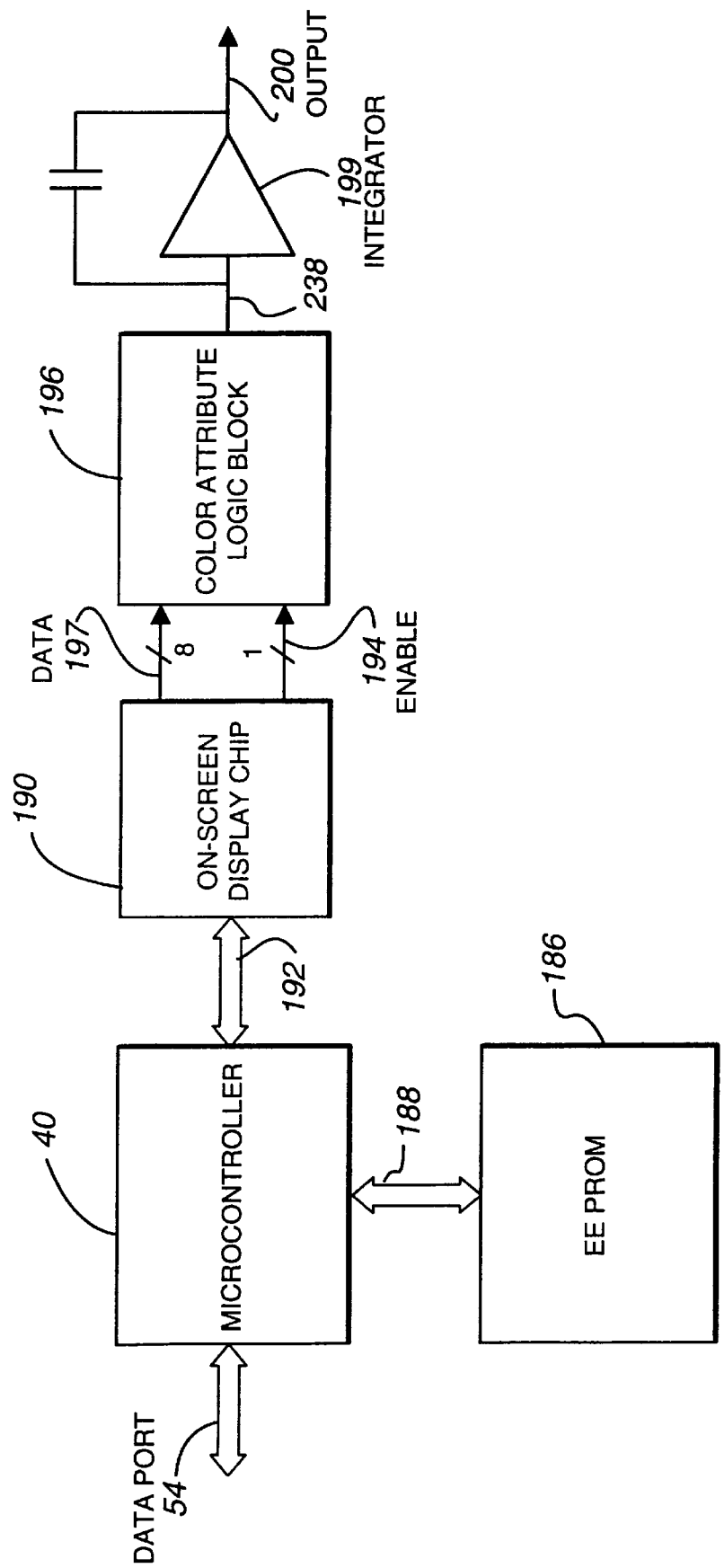
FIG. 7 is a schematic block diagram illustrating the use of an on-screen display chip in accordance with the present invention.

FIG. 7 is a schematic block diagram illustrating a further implementation of an on-screen display chip 190 for generating correction signals. As shown in FIG. 7, microcontroller 40 is coupled to EEPROM 186 via communications port 188. Micro-controller 40 is also connected to on-screen display chip 190 via communications port 192. Micro-controller 40 is also connected to a data port 54. On-screen display chip 190 produces an enable output 194 that enables the operation of color attribute logic block 196. On-screen display chip 190 also produces a series of data outputs 197 that are also applied to color attribute logic block 196. Integrator 199 integrates the pulse density modulation signal 238 from color attribute logic block 196 to produce an output correction signal 200.

Figure 8:
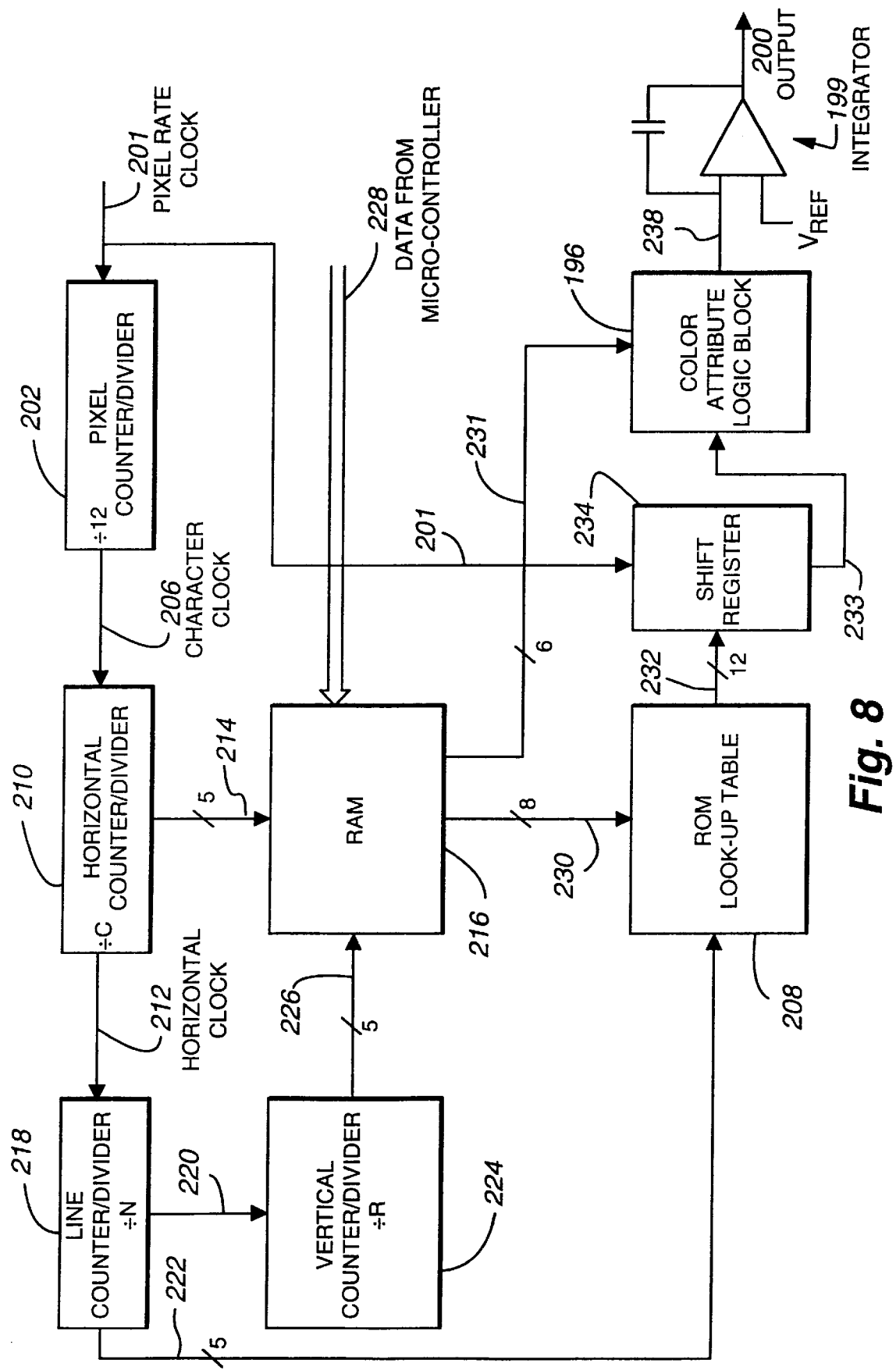
FIG. 8 is a more detailed block diagram illustrating the manner in which the on-screen display chip is implemented in accordance with the present invention.

FIG. 8 is a more detailed schematic diagram of an on-screen display chip 190, logic block 196 and integrator 199, that are configured to generate pulse density modulation signals. As illustrated in FIG. 8, a clock input 201 is applied to a pixel counter/divider 202 and shift register 234. The clock input 201 is the pixel rate clock that produces a pulse for each pixel going across the screen. For example, this clock could be a 35 megahertz clock for a monitor having a pixel rate of 35 megahertz. The pixel counter/divider 202 produces an output signal 206, which divides the input clock 201 by a predetermined number (e.g. 12) to produce a carry signal at output 206. For example, pixel counter/divider 202 is configured to produce an output 206 for every 12 input clock pulses. Since the fonts that are stored in the ROM look-up table 208 are 12 pixels across, the output 206 of pixel counter/divider 202 produces a pulse (character clock signal) at the end of each line of each character. The character clock 206 of pixel counter/divider 202 is applied to the input of horizontal counter/divider 210. Horizontal counter/divider 210 produces an output signal 212 that divides the input signal 206 by a predetermined number (C) that is representative of the number of characters that are stored across each line in the RAM 216. Again, this is a carry signal that occurs when the counter 210 rolls over. The output pulse 212 occurs at the end of each horizontal line and is analogous to a horizontal deflection signal or horizontal clock. Horizontal counter/divider 210 also produces an output 214 that can comprise a 5 bit signal that is an accumulation of the number of pulses received on input 206. In other words, horizontal counter/divider 210 accumulates the number of inputs 206 and provides that information in a 5 bit output address signal at output 214 until the counter is re-set by the carry pulse 212. The 5 bit signal 214 is representative of the address of the column that is being addressed in RAM 216. Hence, output 214 constitutes a series of sequential addresses of (C) number of columns of addresses across RAM 16.

As also shown in FIG. 8, line counter/divider 218 receives the horizontal clock output 212 from horizontal counter/divider 210 that occurs at the end of each line, and divides that input by a number (N) that is representative of the height of each font that is stored in ROM look-up table 208, and produces an output carry pulse 220. In other words, the output carry pulse 220 occurs at the end of the last line of each row of fonts stored in the ROM look-up table 208. Output 222 from line counter/divider 218 is a 5 bit signal that is an accumulation count of the input pulses 212. The accumulated count signal 222 is representative of the number of the line that is being addressed within a font. This 5 bit signal 222 is re-set at the time of the carry pulse 220 so that a new line count starts for each row of fonts. In other words, signal 222 is a 5 bit address signal that is applied to the ROM look-up table 208 that indicates the address of how many lines down within a character ROM look-up table 208 is being addressed. Vertical counter/divider 224 receives the carry pulse 220 from line counter/divider 218 that occurs when an entire row of characters has been addressed, and accumulates that count to produce a 5 bit output 226 that is representative of the row of characters or fonts that is being addressed in RAM 216.

As additionally shown in FIG. 8, RAM 216 receives a 5 bit address signal 214 that is representative of the column of a stored address signal in RAM 216. RAM 216 also receives a 5 bit address signal 226 that is representative of the number of the row that is being addressed in RAM 216. Hence, the two 5 bit address signals, 214 and 226 function together to sequentially address locations in RAM 216. Data from the micro-controller 40 (FIG. 7) is stored in the RAM 216 via input 228. The character data stored in RAM 216 comprises the addresses of fonts that are stored in ROM look-up table 208. The output 230 of RAM 216 is an 8 bit address signal that is applied to the ROM look-up table 208. RAM 216 also simultaneously produces a 6 bit output signal 231 that is applied to color attribute logic block 196. The 6 bit signal 231 controls the logic functions of color attribute logic block 196 together with the serial data from shift register 234 that is applied on serial input 233. The 8 bit address signal 230 addresses a specific block location in the ROM look-up table 208 where a particular font is stored. When a particular font is addressed by address signal 230, the address count on line 222 from line counter/divider 218 indicates the particular row within the character that is being addressed. Since each row of each character contains 12 bytes, a parallel output signal 232, which is 12 bytes wide, is stored in shift register 234. The clock signal 201 is then used by serial shift register 234 to serially shift the data to color attribute logic block 196. Color attribute logic block 196, which is more fully disclosed in FIG. 15, produces a pulse density output signal 238, which is applied to integrator 199. Integrator 199 produces the output 200 that is an integrated version of pulse density signal 238.

Figure 9:
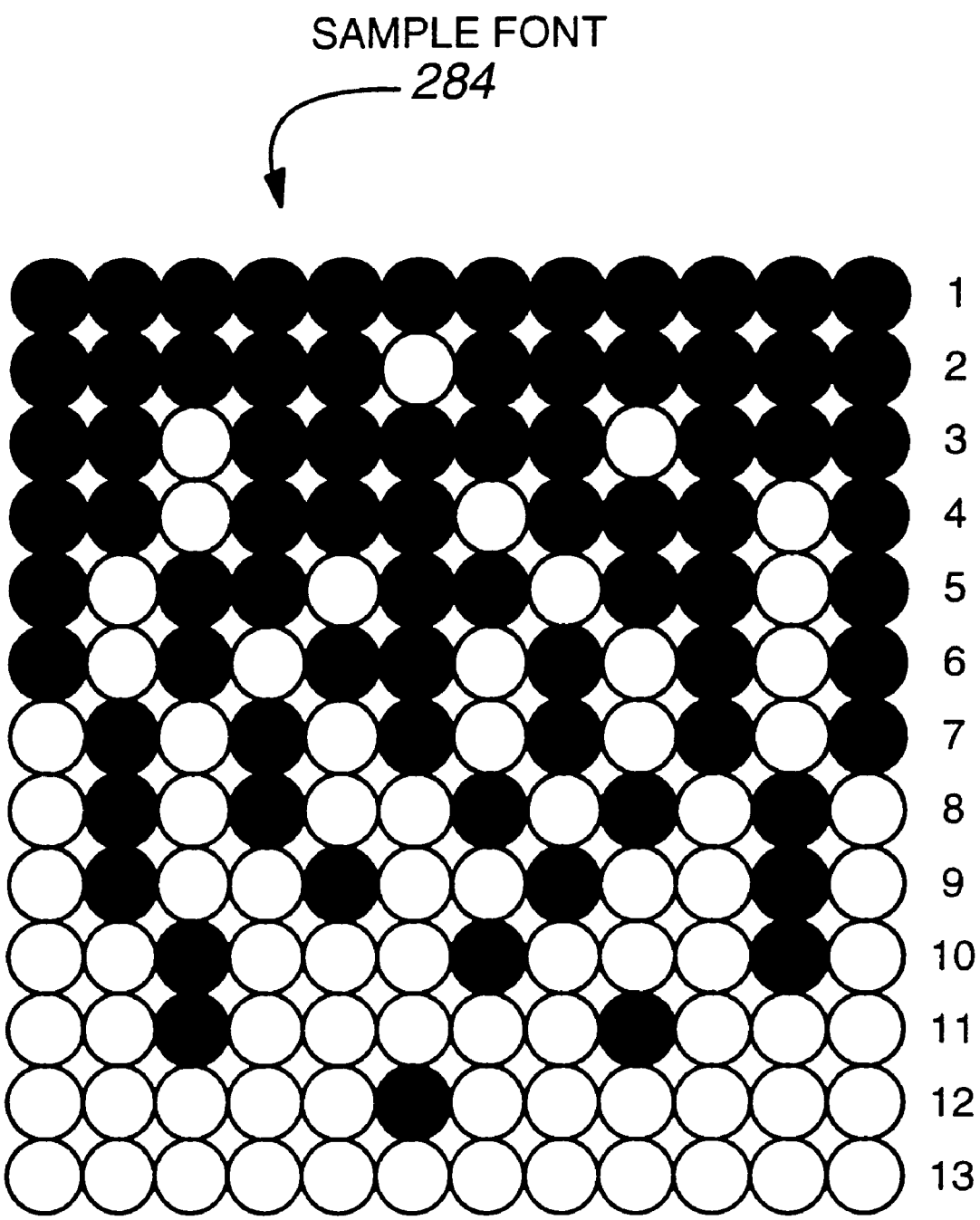
FIG. 9 is a schematic illustration of a sample font that may be stored in the on-screen display chip.

FIG. 9 is a schematic illustration of a sample font 284 that may be stored in ROM look-up table 208. Sample font 282 illustrates 13 rows of data that decrease from 0 bits stored in the first line to 12 bits that are stored in the last line. In this manner, a gradient of pulses can be achieved vertically down the character. The patterns that are illustrated in FIG. 9 were also chosen to distribute the number of pixels evenly across the sample font 282. For these reasons, the pattern interfaces well with neighboring fonts, both horizontally and vertically.

Figure 10:
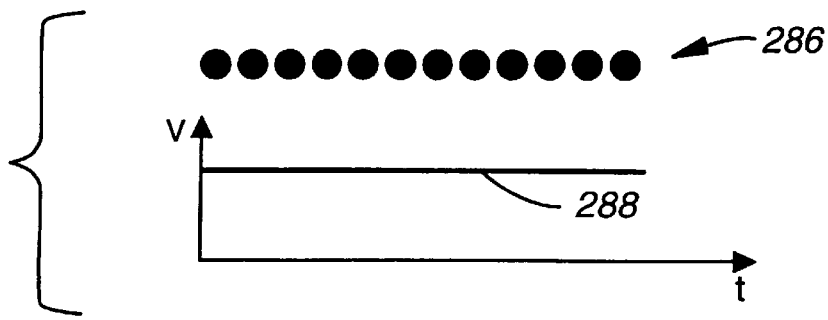
FIGS. 10 through 13 illustrate a separate line of pixels that are stored in the font of the on-screen display chip and the resultant waveform that is generated by these pixels.

FIG. 10 schematically illustrates the voltage waveform 288 that is produced when reading a row of pixels 286 when none of the pixels are lit. Integrator 199 (FIG. 8) produces an output 200 that corresponds to the waveform 288, illustrated in FIG. 10, when none of the pixels are lit, as illustrated by the unlit row of pixels 286.

Figure 11:
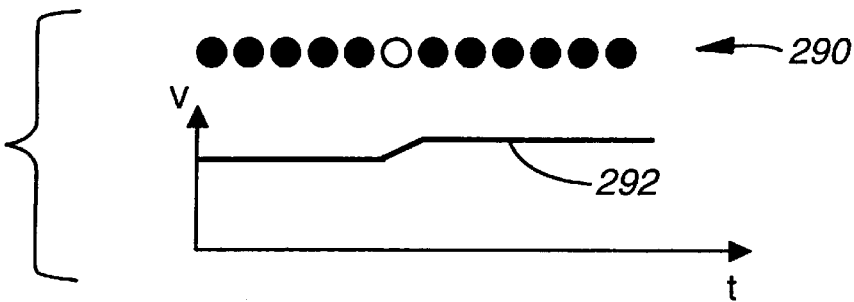

FIG. 11 illustrates the waveform 292 that is generated at output 200 of integrator 199 when a row of pixels 290 is applied to the input of the integrator 199. As shown, the row of pixels 290 has only one pixel that is lit which causes the waveform 292 to have only one sloping portion.

Figure 12:
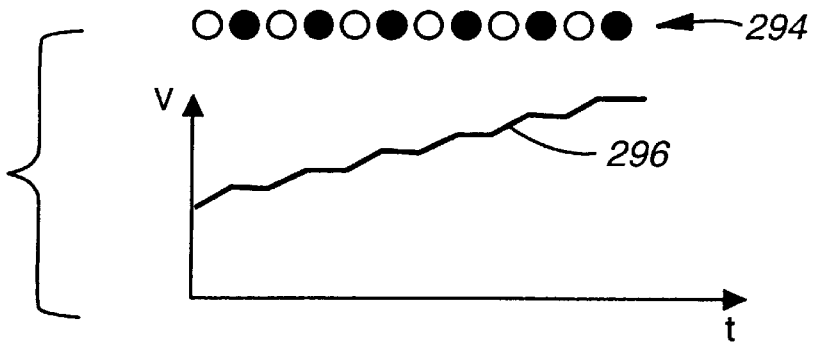

FIG. 12 is an illustration of a waveform 296 that is generated by integrator 199 when half of the pixels are lit, as illustrated by the row of pixels 294. The average slope of the waveform 296 is half of the maximum slope that can be achieved.

Figure 13:
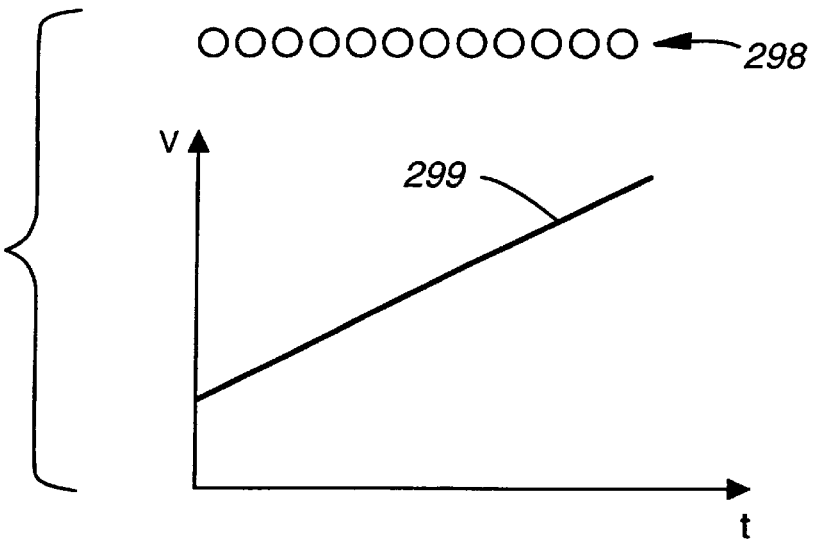

FIG. 13 is an illustration of a waveform 299 that is generated by integrator 199 (FIG. 8) when all of the pixels are lit, as illustrated by row of pixels 298. As shown in FIG. 13, the maximum slope of the waveform 299 is achieved in this instance.

FIG. 14 is a schematic illustration of a gradient font table 237. As shown in FIG. 10, 169 different fonts can be generated that produce all of the different gradients between 0 and 12, and 12 and 0. Font table 237 can be stored in ROM look-up table 208 (FIG. 8) so that the correction signals generated for that portion of the screen match closely with correction signals on adjacent rows. In other words, correction signals may vary down the face of the monitor and fonts can be selected so that the correction factor for adjacent rows matches closely. The gradient font table 237 of FIG. 10 allows for the selection of any of the various correction factors that exist between 0 and 12, and between 12 and 0.

FIG. 15 is a schematic diagram of the color attribute logic block 196 illustrated in FIG. 8. As shown in FIG. 15, the serial input 233 from the shift register comprises serial binary data that is derived from the fonts stored in ROM look-up table 208 (FIG. 8). The serial data is applied to one-shot multi-vibrator 244, producing a pulse output that does not vary with frequency. The output of one-shot 244 is applied via connector 246 to the control input of multiplexer 250. These pulses from one-shot 244 cause multiplexer 250 to select either input 252 or input 254 from connector 231 as output 256 of multiplexer 250. In a normal on-screen display chip, the 6 bit signal 231 may represent foreground or background color, blinking, or other desired functions of the on-screen display chip. In this application of the on-screen display chip, however, data is stored in RAM 216 for generating correction waveforms for monitors and transmitted to multiplexer 250 via connector 231. Since this data is stored in RAM 216, the data can be selected by the user of the system via input 228 from the micro-controller (FIG. 8). Control signal 246 selects whether input 252 or input 254 is to be connected to output 256 of multiplexer 250, as set forth above. Output 258 is applied to the input of tri-state logic device 264, while output 262 is applied to the input of tri-state logic device 266. Output 260 is applied to the enable input of both tri-state logic devices 264 and 266. When enabled by control signal 260, each of the tri-state logic devices produces an output that is either a high or low signal that is applied to weighting resistors 268 and 270. Weighting resistors are selected to produce the desired slope at output 200 of integrator 199. The voltage reference signal 276 is set at some intermediate voltage level between the high and low ranges of signals 272 and 274 (which are combined to produce output 238) so that both positive and negative sloping outputs are produced at output 200. Of course, if tri-state logic devices 264 and 266 are not enabled by control signal 260, a flat output is produced at output 200.

FIG. 16 is a schematic block diagram of the implementation of the present invention with a pulse-width modulator 400 that has pulse-width modulated signal outputs 412 coupled to integrators 402 to produce a series of integrated outputs 404. RAM 410 produces a data signal 406 and an address signal 408 that are applied to the pulse-width modulator 400. Pulse-width modulator 400 uses the data input 406 and address signal 408 to generate the pulse-width modulated signals 412. Micro-processor 414 generates the data signals 406 and address signals 408 and supplies these signals to RAM 410 via communications port 416.

FIG. 17 is a detailed schematic block diagram of the pulse-width modulator 400 that is connected to RAM 410 and micro-processor 414. As shown in FIG. 17, the data line 406, which comprises and 8 bit parallel bus, is applied to each of the latches 418, 420 and 422. The 5 bit parallel address signal 408 is applied to an address decoder 422 that produces 32 separate address lines 426 that are individually applied to latches 418 through 422. As shown, the address line for latch 418 is address line 428 that is applied to the load input of latch 418. Similarly, address line 430 is applied to latch 420 and address line 432 is applied to latch 422. Hence, each of the latches 418 through 422 loads the data on data bus 406 when the address line for that latch activates the load input. In this manner, RAM 410 can address the specific latch in which the data is to be loaded.

As further shown in FIG. 17, each of the latches 418, 420 and 422 have an 8 bit output 434, 436 and 438 that are applied to the inputs of comparators 440, 442 and 444, respectively. Counter/divider 446 receives clock signal 448 and accumulates the clock signal to produce a count signal 450. The count signal 450 is applied to each of the comparators 440 through 444 which compare the count signal with the 8 bit signal loaded into the comparator from its associated latch. When the count signal 450 matches the signal loaded by the latch, each of the comparators 440, 442 and 444 produce outputs 452, 454 and 456, that are applied to the set input of flip flops 458, 460 and 462, respectively. When flip flops 458, 460 and 462 are set, they produce an output signal at outputs 464, 466 and 468, respectively, until they are reset. Counter/divider 456 also produces a reset signal 470 that is applied to reset input 472, 474 and 476 of flip flops 458, 460 and 462, respectively. Reset signal 470 is generated every 256 counts of input clock 448. Reset 470 also resets the count output 450 of counter/divider 446.

In operation, the pulse-width modulator 400, illustrated in FIG. 17, produces pulse-width modulated output signals 464, 466 and 468 that have a width that is determined by the 8 bit signal 434, 436 and 438 that are applied to comparators 440, 442 and 444, respectively. Hence, the data that is addressed in RAM 410 by micro-processor 414 and generated on data bus 406 is loaded into the latches according to the address generated by RAM 410. In this manner, the micro-processor 414 can program the pulse width of the outputs 464, 466 and 468.

As disclosed in U.S. Pat. No. 5,216,504, the pulse-width modulation signals are used for correction of vertical geometries, while the pulse density modulation signals are used to correct horizontal geometries. As illustrated in FIG. 18, a monitor 480 is shown having a rectangular or square bezel 482. The bezel 482 surrounds the monitor screen 484 that has a raster 486 that is generated on the screen 484. As shown in FIG. 18, raster 486 has a pin-cushion shape which is narrower in the center and wider at the top and bottom of the screen 484. The pin-cushion shape of raster 486 is generally parabolic in nature.

FIG. 19 illustrates the left side of raster 486 and an example of a correction voltage waveform 488 that is the mirror image of the generally parabolic shape of the pin-cushion shape of raster 486. By generating a correction voltage waveform 488 that is applied to the deflection coils of monitor 480, ideally, the edge of the raster 486 would form a vertical straight line that is parallel to bezel 482.

FIG. 20 is a schematic illustration of a desired, generally parabolic, correction waveform 488 that would ideally be produced to correct the pin-cushioning shape of raster 486. Correction waveform 488 comprises the ideal, desired waveform that can be used to offset the pin-cushioning of raster 486, as described above.

FIG. 21 illustrates the time derivative waveform 490 of the correction waveform 488 illustrated in FIG. 20. By taking the derivative of the correction waveform 488, a generally S-shaped curve 490 is produced that is the time derivative of the correction waveform 488.

FIG. 22 is a digital approximation derivative waveform 494 of the derivative waveform 490. As shown in FIG. 22, a series of digital voltages that comprise piecewise linear approximations of derivative waveform 490 are generated over 16 equal time periods that correspond to the time duration of derivative waveform 490.

FIG. 23 illustrates an integrated waveform 494 that is the integrated version of the digital approximation waveform 492 that is an approximation of the correction waveform 488. As shown, the integrated waveform 494, is a continuous smooth waveform, that is a close approximation of correction waveform 488 (FIG. 20).

As shown in FIG. 24, the correction waveform 488 (FIG. 20) can also be directly digitally approximated as shown by digital approximation correction waveform 496. As illustrated in FIG. 24, the digital approximation correction waveform 496 is a discontinuous waveform that has voltage differences at each of the time periods t1 through t16. These discontinuities do not exist in the integrated waveform 494, since the integrated signal from each of the integrators 402 (FIG. 16) continues with the last voltage of the digital approximation derivative waveform 494 at the end of each time period as it starts to integrate the next voltage level of the next time period.

FIG. 25 schematically illustrates the result of application of the integrated waveform 494 to correct pin-cushioning and the application of the digital approximation correction waveform 496 to correct pin-cushioning. As shown in FIG. 25, when the digital approximation correction waveform 496 is applied to the deflection coils, a digital approximation corrected raster 498 is produced that is schematically illustrated on the left side of the raster of monitor 480. As shown in FIG. 25, the digital approximation corrected raster 498 has a series of discontinuities along the edge of the raster. Of course, these discontinuities would be apparent on both sides of the raster, but FIG. 25 is intended to separately illustrate the effect of both the digital approximation correction waveform 496 and the integrated waveform 494 on a single monitor 480. When the integrated waveform 494 is applied to the deflection coils of monitor 480, an integrated waveform corrected raster 500 is produced that is continuous along the vertical side of the monitor, as illustrated on the right side of the monitor 480. The integrated waveform corrected raster 500 is smooth and continuous and does not include any discontinuities as does the digital approximation corrected raster 498. The discontinuities of the digital approximation corrected raster 498 can become even more apparent when the digital approximation correction waveform 496 (FIG. 24) is not synchronized with the horizontal sync signal of monitor 480. The integrated waveform signal 494 produces a smooth, continuous waveform that is synchronized with the horizontal sync signal of monitor 480.

As shown above, the use of derivative waveforms that are digitally approximated by pulse-width modulator 400 (FIG. 16), corresponding to the digital approximation derivative waveform 492, can be integrated by integrators 402 (FIG. 16) to produce the integrated outputs 404 that are applied to the deflection coils to produce an integrated waveform corrected raster 500 (FIG. 25) that is smooth and continuous. Although various filters have been used in an attempt to eliminate the discontinuities of the correction signals that are generated by the digital approximation correction waveform 496, such filtering increases the time constant of the circuits which prevents these corrections from being produced. Others have attempted to decrease the effect of the discontinuities illustrated in digital approximation corrected raster 498 by producing more correction signals, but such techniques require the storage of a significantly greater amount of data. Although the technique of integrating pulse-width modulation signals to generate correction signals for pin-cushioning has been disclosed, this technique can be also applied to correct other vertical geometries and distortions, as well as horizontal geometries and distortions.

FIG. 26 is a schematic flow diagram of the manner in which a gain matrix table can be utilized to reduce the number of iterations in an alignment process. As disclosed above and in U.S. Pat. No. 5,216,504, corrections are made to both horizontal and vertical geometries in a monitor by previously stored monitor correction table data that is contained within the RAM 124 of U.S. Pat. No. 5,216,504, the data storage device 42 of FIG. 1 above, RAM 62 of FIG. 2 above, RAM 181 and 182 of FIG. 6 above, EEPROM 186 and on-screen display chip 190 of FIG. 7 above, RAM 216 of FIG. 8 above, RAM 310 of FIG. 16 above, and RAM 410 of FIG. 18 above. The monitor correction table data is data that has been previously determined that indicates the various interactions between the various horizontal and vertical geometries of the monitor. So, for example, movement of horizontal center may affect a number of geometries including vertical linearity, keystoning, pin balance, etc., as more fully disclosed in U.S. patent application Ser. No. 08/258,695, filed Jun. 13, 1994, by James R. Webb, et al., now U.S. Pat. No. 5,504,521, issued Apr. 2, 1996 and a paper entitled "Firmware For a Continuous Frequency CRT Monitor" by Steven J. Lassman, Display Laboratories, Inc., Boulder, Colo. that was published in the Digest of Technical papers, Society for Information Display, International Symposium, San Jose McEnery Convention Center, San Jose, Calif., Jun. 14–16, 1994. Hence, the various interactions between the various vertical and horizontal geometries can be determined for any particular type of tube and stored in the form of correction equations in a monitor correction table within the monitor, as disclosed above.

As may be apparent, a large number of geometries and distortions can be corrected and a multiplicatively larger number of interactions exist that affect other geometries when any particular geometry is modified. Hence, a large amount of data may be required to be stored in the monitor correction table that is stored in the monitor. Typically, 16 K bytes of storage is used in the monitor to store the monitor correction table data. Because of the expense involved in having 16 K bytes of storage in each monitor that is sold, and the expense of determining all of the interactions between the various geometries of a monitor, monitor manufacturers have reduced the amount of storage in some models of monitors and have stored a lesser amount of monitor correction table data that indicates these interactions. These less intelligent monitors, as a result, are more difficult to align.

During the alignment procedure, a number of iterations may be required by the vision system that is disclosed in U.S. Pat. No. 5,216,504 to achieve proper alignment of the less intelligent monitors since correction of one geometry may not result in the proper correction of another geometry due to the lack of intelligence stored in the monitor to provide such corrections. For example, if the vision system changes the horizontal size during the alignment process, a less intelligent monitor may not have the data stored in the correction table data of the monitor to determine the manner in which a change in horizontal size will affect the pin-cushioning. Hence, modification of the horizontal size to properly position the raster and picture on the monitor screen may cause the pin-cushioning to be out of alignment. If the pin-cushioning is then corrected, the horizontal size may not be correct because of the effect of pin-cushioning on horizontal size. In this manner, numerous iterations may be required to achieve proper correction of all of the various horizontal and vertical geometries to achieve alignment of less intelligent monitors.

FIG. 26 illustrates the manner in which a gain matrix table can be used with less intelligent monitors to achieve alignment with significantly fewer iterations during the alignment process. As shown in FIG. 26, at step 510 the initial correction table data is derived for a particular type of monitor using the various techniques known in the industry, as pointed out above. For less intelligent monitors, the correction table data and interrelationships may be an abbreviated subset of the total number of corrections and interrelationships that can be determined for a specific monitor, as pointed out above. At step 512, the less intelligent monitor is then loaded with the correction table data. This data is stored in the memory located in the monitor, as indicated above. Steps 510 and 512 are the standard steps used to prepare intelligent and semi-intelligent monitors for alignment by the vision system described in the above-referenced U.S. Pat. No. 5,216,504. At step 514, the vision system generates a gain matrix table in the manner described in FIG. 27 below. This gain matrix table generates the correction data that is not included in the correction table data that would normally be stored in an intelligent monitor, but is not stored in a less intelligent monitor because of the lack of the storage capability of less intelligent monitors. This intelligence is automatically generated by the vision system and stored in the form of a gain matrix table within the vision system for this particular model of monitor. Since only slight variations exist between individual monitors of particular models of monitors, the gain matrix table only needs to be generated once, or very infrequently, for the alignment of any particular model of monitor. At step 516, the less intelligent monitors are then aligned in the standard manner using the vision system, with the exception that the vision system utilizes the gain matrix table to predict the effects that each alignment geometry will have on other alignment geometries, so as to significantly reduce the number of iterations required to properly align the monitor. For example, if the horizontal size needs to be increased to achieve proper alignment, the gain matrix table will determine the amount of correction that may be required in the pin-cushioning for a specified amount of change in horizontal size, so that when the horizontal size is changed, the proper amount of pin-cushioning will also be achieved. Although this is just one example of the manner in which the gain matrix table can predict the proper alignment, numerous interrelationships exist between the various horizontal and vertical geometries that can be determined, in the manner disclosed in the above-referenced materials.

FIG. 27 is a flow chart illustrating the manner in which a gain matrix table is generated. At step 518, the vision system generates signals to modify a series of geometries in a sample monitor. The series of geometries can comprise each of the geometries, or some subset if a less comprehensive gain matrix table is desired. A sample monitor would comprise any typical monitor of the same model and type to be aligned that has the monitor correction table data stored in its monitor correction table. By having the monitor correction table data stored in the monitor, modification of the geometries of the monitor will indicate the portions in which the correction table data of the less intelligent monitor does not provide the required corrections to achieve proper alignment. At step 520, the vision system determines the effect of each of these modifications of the series of geometries and correction factors on other geometries and correction factors within the monitor. Again, a subset of all of the other geometries can be selected so that a less comprehensive gain matrix table can be generated. At step 522, the vision system stores the data relating to the effect that modifying the series of geometries has on the other geometries. This data comprises a series of data points that are stored in a standard relational database. At step 524, the standard curve fitting methods are used on the data that is stored in the relational database to generate equations and data parameters for the gain matrix table. Of course, any desired curve fitting methods can be used, including linear approximations or more complex approximations including second order, third order, . . . n order approximations using least squares regression techniques, or other curve fitting techniques that are well known. In this manner, a gain matrix table is generated and stored in the vision system so that the relationship between various geometries of the monitor allow the vision system to predict the proper alignment during the alignment process, and thereby reduce the number of iterations required to achieve proper alignment. This greatly reduces the time required on the production line to achieve proper alignment of less intelligent monitors.

FIG. 28 is a flow diagram illustrating the manner in which monitor correction tables in intelligent monitors may be updated in a systematic fashion in a production line using the gain matrix table of the vision system to ensure that proper data is being stored in the monitor correction tables of the intelligent monitors. At step 526, the monitor correction table data is derived for the particular model of the intelligent monitor. At step 528, the intelligent monitor is loaded with the monitor correction table data that is generated in step 526. At step 530, the gain matrix table is generated using the vision system as described in FIG. 528. For intelligent monitors, the gain matrix table usually contains little or no data since the monitor correction table data, if correctly derived, includes the information regarding the interrelationships between the various alignment parameters. However, on occasion, the monitor correction table data is incorrectly derived at step 526, or, changes may occur over a period of time for a particular model of monitor. At step 532, the vision system determines if significant corrections exist in the gain matrix table that would indicate that the monitor correction table data is incorrect. In such a case, the vision system is coupled to the computer system on the production line that loads the monitor correction table data into the monitors. The vision system can be coupled through standard communication ports such as an RS 232 communication port, to modify the correction table data that is being loaded into the intelligent monitors, as illustrated at step 534. A gain matrix table is again generated by the vision system to determine if the monitor correction table data has been properly corrected. If it is determined that no significant corrections exist in the gain matrix table at step 532, the monitors are aligned using the vision system in the production line at step 536. In order to assure that a proper gain matrix table is being used by the vision system, the vision system is programmed to automatically generate a new gain matrix table after a predetermined number of monitors have been aligned. As illustrated at step 538, the vision system determines if a predetermined number of monitors have been aligned. If the predetermined number has been reached, the system continues to align monitors. If the predetermined number has been reached, a new gain matrix table is generated at step 530 and the various steps and determinations proceed as described above. Of course, limits can be imposed in the gain matrix table data to ensure that improper changes are not being made.

The present system therefore provides numerous inventive concepts including various implementations for using on-screen display chips to generate fonts that have gradients that match neighboring correction signals to achieve smooth corrections across the face of the monitor. These corrections can also be generated with a math engine that is capable of generating the various gradients of correction signals that are required. The present invention also utilizes techniques for integrating digital approximations of derivative functions to achieve smooth and continuous output correction signals for correcting vertical and horizontal geometries. The present invention also utilizes gain matrix tables to speed the alignment process of less intelligent monitors in production line processes, as well as providing a system for insuring that intelligent monitors include accurate and current correction table data.

A presently preferred embodiment of the present invention has been described above with a degree of specificity.

It should be understood, however, that this degree of specificity is directed toward the preferred embodiment. For example the signal levels described above could be inverted or otherwise different, and/or the numbers of bytes, columns, rows, groups and bits per byte could be different. The invention itself, however, is defined by the scope of the appended claims.

What is claimed is:

1. A method of generating a gradient of pulse density modulation signals from an on-screen display device for correcting a video monitor comprising the steps of:

retrieving a plurality of gradient tables from said on-screen display device in a predetermined order such that rows of pixels stored in said gradient tables form a predetermined pixel density gradient between said rows of pixels and said gradient tables;

reading said rows of pixels of said plurality of gradient tables to produce a first data signal;

reading a series of second data signals that are stored in association with said gradient tables;

logically combining said series of first and second data signals to produce said gradient of pulse density modulation signals.

2. A method of using a vision system for aligning monitors comprising the steps of:

deriving monitor correction table data for said monitor;

loading said monitor correction table data into said monitors;

generating a gain matrix table using said vision system by modifying at least one parameter of said monitor, measuring a change in a plurality of other parameters and generating a table of correction interactions that exist for said correction table data;

using said gain matrix table to predict proper alignment corrections.

3. A method of using a vision system for aligning a monitor using a gain matrix table that includes correction interactions for correcting monitor distortion that are not included in monitor correction table data stored in said monitor comprising the steps of:

generating said gain matrix table by modifying at least one parameter of said monitor, measuring a change in a plurality of other parameters and generating a table that includes said correction interactions that are not included in said monitor;

using said gain matrix table to align said monitor so that alignment can be achieved by predicting proper alignment corrections through the use of said correction interactions.

4. A method of modifying monitor correction table data in a monitor comprising the steps of:

(a) deriving monitor correction table data for said monitor;

(b) loading said monitor correction table data into said monitor;

(c) generating a gain matrix table by modifying at least one parameter of said monitor, measuring a change in a plurality of other parameters and generating a table having correction interactions that are not included in said monitor correction table data;

(d) modifying said monitor correction table data using said gain matrix table whenever significant correction factors exist in said gain matrix table;

(e) repeating steps (c) and (d) each time a predetermined number of monitors has been loaded with said monitor correction table data.

5. The method of claim 4 further comprising the steps of:

(e) repeating steps (c) and (d) each time a predetermined number of monitors has been loaded with said monitor correction table data.

6. A method of modifying monitor correction table data in a monitor comprising the steps of:

(a) deriving monitor correction table data for said monitor;

(b) loading said monitor correction table data into said monitor;

(c) generating a gain matrix table by modifying at least one parameter of said monitor, measuring a change in a plurality of other parameters and generating a table having correction interactions that are not included in said monitor correction table data;

(d) modifying said monitor correction table data with said correction data each time a predetermined number of monitors has been loaded with said monitor correction table data.

7. A method of modifying monitor correction table data in an intelligent monitor comprising:

generating a gain matrix table by modifying at least one parameter of said monitor, measuring a change in a plurality of other parameters and generating a table of correction interactions of said monitor correction table data from said correction interactions that are not included in said monitor correction table data;

modifying said monitor correction table data using said gain matrix table whenever significant correction factors exist in said gain matrix table.

8. A method of modifying monitor correction table data in a monitor for improving a process of aligning said monitor comprising the steps of:

generating a gain matrix table by modifying at least one parameter of said monitor, measuring a change in a plurality of other parameters to determine correction interactions that exist between said at least one parameter and said plurality of parameters;

modifying said monitor correction table data using said gain matrix table to improve said process of aligning said monitor.

9. A method of aligning a monitor using monitor correction table data comprising:

generating a gain matrix table by determining correction interactions of said monitor that exist for a plurality of correction parameters of said monitor;

using said monitor correction table data in conjunction with said gain matrix table to align said monitor.

* * * * *